Jan. 21, 1975 C. B. KREKELER Re. 28,310

MEANS FOR REMOVABLY AFFIXING CUTTER BIT AND LUG ASSEMBLIES TO DRIVEN ELEMENTS OF A MINING MACHINE OR THE LIKE

Original Filed Oct. 13, 1971 9 Sheets-Sheet 1

INVENTOR

CLAUDE B. KREKELER

BY Melville, Strasser, Foster and Hoffman
ATTORNEYS

INVENTOR

CLAUDE B. KREKELER

BY Melville, Strasser, Foster and Hoffman
ATTORNEYS

Jan. 21, 1975 C. B. KREKELER Re. 28,310
MEANS FOR REMOVABLY AFFIXING CUTTER BIT AND LUG ASSEMBLIES TO DRIVEN ELEMENTS OF A MINING MACHINE OR THE LIKE
Original Filed Oct. 13, 1971 9 Sheets-Sheet 3
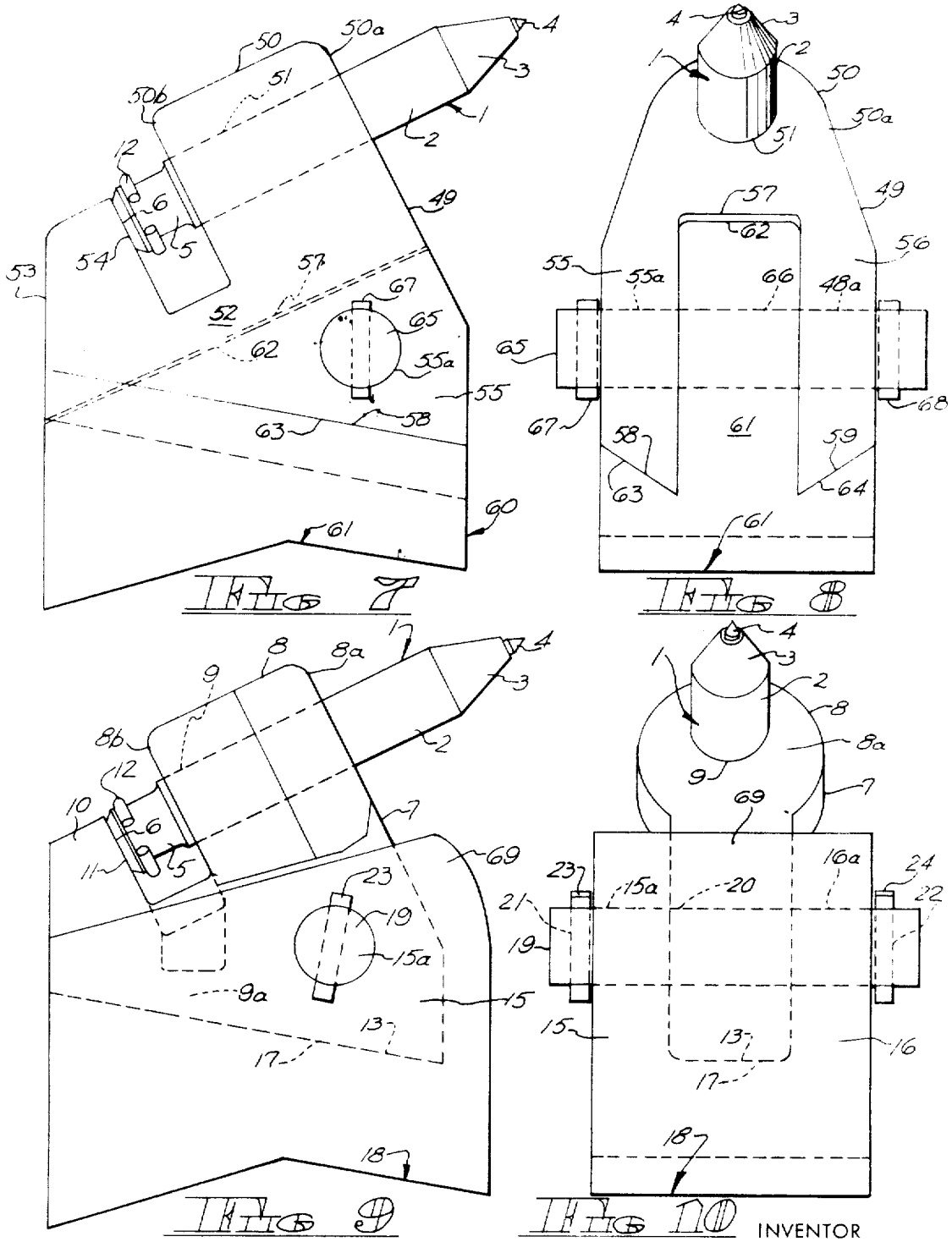
INVENTOR
CLAUDE B. KREKELER
BY Melville, Strasser, Foster and Hoffman
ATTORNEYS MEANS FOR REMOVABLY AFFIXING CUTTER BIT AND LUG ASSEMBLIES TO DRIVEN ELEMENTS OF A MINING MACHINE OR THE LIKE Original Filed Oct. 13, 1971 9 Sheets-Sheet 4

INVENTOR
CLAUDE B. KREKELER

BY Melville, Strasser, Foster and Hoffman
ATTORNEYS

INVENTOR,
CLAUDE B. KREKELER

BY Melville, Strasser, Foster and Hoffman
ATTORNEYS

MEANS FOR REMOVABLY AFFIXING CUTTER BIT AND LUG ASSEMBLIES TO DRIVEN ELEMENTS OF A MINING MACHINE OR THE LIKE

Original Filed Oct. 13, 1971 9 Sheets-Sheet 6

INVENTOR,
CLAUDE B. KREKELER

BY Melville, Strasser, Foster and Hoffman
ATTORNEYS

INVENTOR
CLAUDE B. KREKELER

BY Melville, Strasser, Foster and Hoffman
ATTORNEYS

INVENTOR
CLAUDE B. KREKELER

BY Melville, Strasser, Foster and Hoffman
ATTORNEYS

Jan. 21, 1975 C. B. KREKELER Re. 28,310

MEANS FOR REMOVABLY AFFIXING CUTTER BIT AND LUG ASSEMBLIES TO DRIVEN ELEMENTS OF A MINING MACHINE OR THE LIKE

Original Filed Oct. 13, 1971 9 Sheets-Sheet

INVENTOR

CLAUDE B. KREKELER

BY Melville, Strasser, Foster and Hoffman
ATTORNEYS

United States Patent Office

Re. 28,310
Reissued Jan. 21, 1975

28,310

MEANS FOR REMOVABLY AFFIXING CUTTER BIT AND LUG ASSEMBLIES TO DRIVEN ELEMENTS OF A MINING MACHINE OR THE LIKE

Claude B. Krekeler, Cincinnati, Ohio, assignor to The Cincinnati Mine Machinery Co., Cincinnati, Ohio Original No. 3,749,449, dated July 31, 1973, Ser. No. 188,778, Oct. 13, 1971. Application for reissue Apr. 29, 1974, Ser. No. 465,360

Int. Cl. E21c *35/18*

U.S. Cl. 299—93 60 Claims

Matter enclosed in heavy brackets [ ] appears in the original patent but forms no part of this reissue specification; matter printed in italics indicates the additions made by reissue.

ABSTRACT OF THE DISCLOSURE

Cutter bit lugs and base members for affixing the cutter bit lugs to a driven element of a mining machine or the like in such a way that the lugs may be readily removed and replaced. Each base member may be permanently affixed to the driven element and has at least one surface adapted to cooperate with at least one surface on its respective lugs to sustain the resultant cutting forces. Means are provided to maintain the lug in position on the base member, the resultant cutting forces on said maintaining means being reduced by the above mentioned cooperating surfaces.

BACKGROUND OF THE INVENTION

1. Field of the Invention

The invention relates to cutter bit lugs and base members for affixing the cutter bit lugs to the driven elements of a mining machine or the like, and more particularly to cutter bit lugs and base members whereby the lugs may be easily and quickly installed or removed and replaced.

2. Description of the Prior Art

While the base member of the present invention may be applied to other equipment such as digging machines, earthworking machines and the like, for purposes of an exemplary showing it will be described with respect to its use on mining machines.

In normal mining operations, cutter bits require frequent replacement due to wear or breakage. It is not unusual for cutter bits to be replaced on a daily basis. In view of this, the prior art has done much work on the provision of readily replaceable cutter bits and have developed, among other things, a variety of "knock-on, pry-out" bits, and bits having readily removable retaining means.

The lug means in which the cutter bits are held, on the other hand, generally are characterized by a longer service life. As a result, the most common practice is to permanently affix the lugs to the driven elements of the mining machine as by welding or the like. Nevertheless, the lugs themselves are subject to wear and breakage. Under extremely severe conditions, lugs may require replacement on a weekly basis.

Since the lugs are usually welded or otherwise permanently affixed to the driven element of the mining machine, their replacement is difficult. Where possible, their replacement is attempted in the field. Frequently, however, it is necessary to remove the driven element from the mining machine and take it to a place where repairs can be made. In either event, it is a difficult and time consuming procedure resulting in considerable down time for the mining machine.

As a result, it is not unusual that the replacement of worn or broken lugs be postponed until the operator of the mining machine has no other alternative. However, when broken or worn lugs are not replaced, the efficiency of the mining machine is diminished and an undue strain is placed upon adjacent bits and lugs. Worn or broken lugs can also result in the production of float dust which not only renders the mining operation more difficult but also constitutes a hazard to the health.

Unlike the problem of providing as easily replaceable cutter bit, the prior art has not expended a great deal of effort in overcoming the problem of providing a readily replaceable bit lug. However, prior art workers have, for example, tried to adapt the lug bearing links of cutter chains for use with cutter arms, cutting drums and the like. In such instances, the lug bearing link-like elements are affixed to the driven elements of the mining machines by pins similar to the pintles used in cutter chains. However, these pins sustain substantially all of the resultant cutting forces and are themselves subject to wear and failure. Other types of "pin-on" lugs have been developed, as exemplified by U.S. letters Pat. No. 3,338,634. In their most usual form, the pin-on lugs have been provided with a pair of spaced, depending legs adapted to straddle a portion of the driven element. One or more pins are then passed through perforations in the lug legs and that portion of the driven element straddled by them. Here again, however, the pins are subject to the resultant cutting forces. In the above noted U.S. Pat. No. 3,338,634 the perforation in the driven element is a slot so that a wedging action is produced. This additionally subjects the pin to shearing forces. Furthermore, it is not uncommon for the lug legs to spread. When this occurs, the lugs tend to wallow during the cutting operation thus increasing the wear on both the legs and the pins and again ultimately resulting in failure of the parts.

The present invention is directed to a base member which may be permanently affixed to the driven elements of the mining machine. It is further directed to lugs for use with the base member, which lugs may be readily installed or removed in the field. The base member and lugs of the present invention overcome the problems set forth above. They may be applied to any suitable form of mining machine driven element, including cutter chains, cutter arms, cutter wheels, cutting drums, oscillating rippers, long wall equipment and the like.

SUMMARY OF THE INVENTION

In general, the present invention contemplates the provision of an upstanding base member welded or otherwise permanently affixed to the driven element of a mining machine at each position where a lug and cutter bit assembly is to be located. In a number of embodiments of the present invention the upper portion of the base member is slotted or bifurcated so as to receive the bottom portion of the lug. Conversely, the bottom portion of the lug may be bifurcated so as to straddle the upper portion of the base member. In either event, the mating surfaces of the base member and lug may be configured to have a dovetail fit so as to prevent the spreading of the bifurcations.

As will be described hereinafter, the lug may be maintained in position on the base member by a transverse pin passing through coaxial perforations in the base member and lug. Alternatively, the lug may be held in place on the base member by a set screw, by a resilient retaining means, by a frictional fit having a wedge-type action, or by combinations of these elements.

The nature of the lug and the type of cutter bit to be used therewith does not constitute a limitation on the present invention.

The bottom surface of the base member may be so configured as to be affixable to drums of different diameters, but at the same time maintaining a constant included angle between the bit axis and that drum center line passing through the bit cutting tip. Irrespective of the nature of the driven element to which the base means is to be attached, the base bottom may be appropriately configured so that the base means will be normal to the surface to which it is affixed or so that the base means will lie at an angle thereto.

In all of the embodiments of the present invention, the base means will have at least one surface adapted to cooperate with at least one surface of the lug so as to sustain the resultant cutting forces and to substantially reduce the resultant cutting forces sustained by the means which maintains the lugs in position on the base member. To accomplish this the above noted pair of cooperating surfaces should be at an angle of 90° or less to the cutting direction, (but not parallel thereto), and preferably at an angle of less than 90°.

BRIEF DESCRIPTION OF THE DRAWINGS

FIG. 7 is a side elevation view of another embodiment of the present invention.

FIG. 9 is a side elevational view illustrating the embodiment of FIG. 1 wherein the base member has been provided with a forward wall portion.

FIG. 10 is a front elevational view of the structure of FIG. 9.

FIG. 15 is a side elevational view diagrammatically indicating the manner in which the base member of the present invention may be configured so that it is applicable to drums of different diameters, but at the same time maintaining a constant included angle between the axis of the cutter bit and that drum center line which passes through the cutting tip of the cutter bit.

FIG. 16 is a side elevational view of yet another embodiment of the present invention.

FIG. 21 is a side elevational view of an embodiment wherein the base member has a gauge determining abutment surface for the cutter bit.

FIG. 23 is a semi-diagrammatic front elevational view of cutting drum having lug and cutter bit assemblies and base members of the present invention affixed thereto so as to form a double helix with the cutter bits of the second helix having paths of travel located between the paths of travel of the cutter bits of the first helix.

DESCRIPTION OF THE PREFERRED EMBODIMENTS

Figure 1:
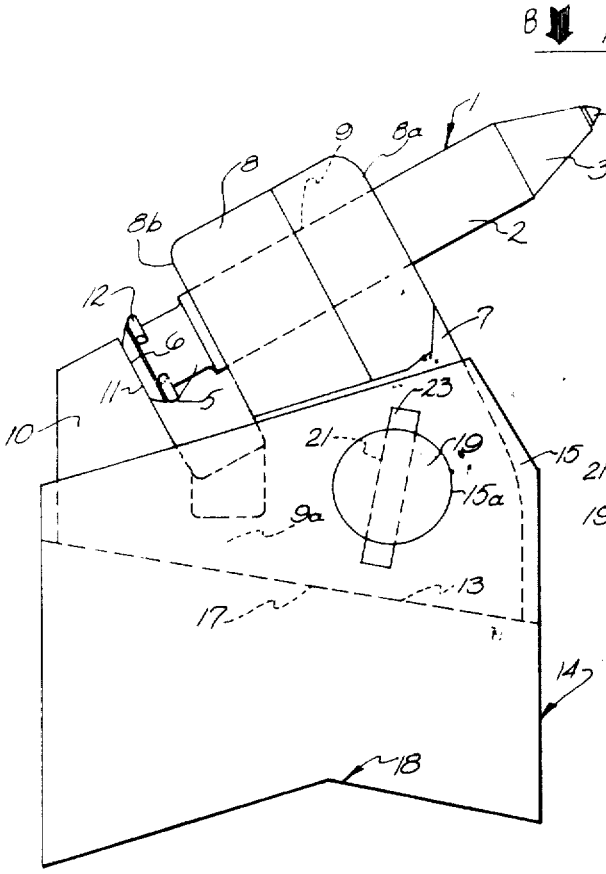
FIG. 1 is a side elevational view of one embodiment of the present invention.
Figure 2:
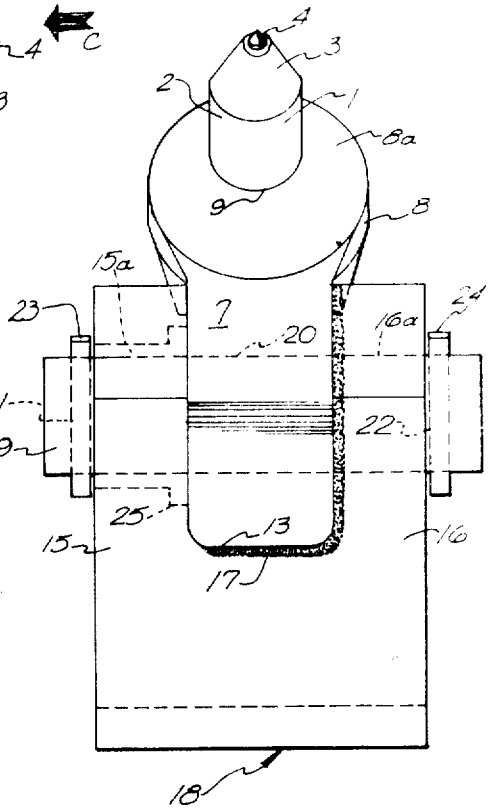
FIG. 2 is a front elevational view of the embodiment of FIG. 1.

FIGS. 1 and 2 illustrate a simple embodiment of the present invention. As will be made evident hereinafter, the type of lug and cutter bit assembly to be used with the base member of the present invention does not constitute a limitation on the invention. For purposes of an exemplary illustration, FIGS. 1 and 2 show a lug with a rotatable pick-type bit as taught in U.S. letters Pat. Nos. 3,397,012, and 3,397,013. Briefly, the cutter bit 1 comprises an elongated shank 2 having at one end a conical nose 3 terminating in a hard cutting tip 4. At the other end of the shank, there is an annular notch 5 and an abutment surface 6. The shank 2 is of circular cross section.

The lug 7 has a body portion 8 with a forward surface 8a and rearward surface 8b. A shank receiving perforation 9 extends through the body 8 and forms openings in the forward and rearward surfaces.

The lug 7 has a rearward extension 9a terminating in an anvil portion 10 having an abutment surface 11. The rearward end of the cutter bit shank 2, including the notch 5, extends beyond the rear surface 8b of the lug body portion. The abutment surface 6 on the cutter bit is adapted to cooperate with the abutment surface 11 on the anvil portion of the lug so as to determine the gauge or depth to which the cutter bit extends into the shank receiving perforation 9. The diameters of the shank receiving perforation 9 and the cutter bit shank 2 are such that the cutter bit is freely rotatable in the shank receiving perforation. Finally, some form of retaining means is provided to prevent removal of the cutter bit during the cutting operation. For purposes of an exemplary showing, a retaining means 12 is illustrated in the form of a split metal ring mounted on the cutter bit shank in the notch 5. The outside diameter of the split metal ring 12 is greater than the diameter of the shank receiving perforation 9 and thus acts to prevent removal of the cutter bit from the lug during the cutting operation. When the ring 12 is removed from the notch 5, the cutter bit 1 may be extracted from the shank receiving perforation for purposes of replacement.

The lug 7 has a bottom surface 13. Heretofore, the bottom surface 13 rested directly on the driven element of a mining machine (such as a chain, cutter arm, cutter wheel, cutting drum or the like) and was welded or otherwise permanently affixed thereto. In accordance with the present invention, the bottom lug surface 13 is adapted to lie in abutting relationship to a mating surface on the base member, as will be described hereinafter.

The base member is generally indicated at 14. It comprises an upstanding block-like element having a pair of bifurcations 15 and 16 at its upper end. Between the bifurcations 15 and 16, the mounting means has a surface 17 adapted to cooperate with the bottom surface 13 of the lug. Finally, the base member 14 has a bottom end generally indicated at 18. As will be described more fully hereinafter, this bottom end 18 will be appropriately configured for permanent attachment to the driven element of the mining machine.

As indicated above, the lug 7 is adapted to be located between the bifurcations 15 and 16 of the base member 14 with its bottom surface 13 in abutting relationship with the surface 17 of the mounting means. Means must be provided for maintaining the lug in the position shown in FIGS. 1 and 2. While such means may take various forms (as will be described hereinafter), for purposes of an exemplary showing the maintaining means in FIGS. 1 and 2 is illustrated as a pin 19. The pin 19 passes through coaxial perforations 15a and 16a in the bifurcations 15 and 16 and a perforation 20 in the lug 7. Finally, means must be provided to prevent axial movement of the pin 19 during the cutting operation. The nature of the means for preventing such axial movement does not constitute a limitation on the present invention. For example, any of the well known keeper means developed with respect to pintles in mining machine chains may be used. For purposes of an exemplary showing, the pin is illustrated in FIGS. 1 and 2 as being of such length as to have its ends extend beyond the outside surfaces of the bifurcations 15 and 16. The ends of the pin are provided with transverse perforations 21 and 22 adapted to receive roll or spiral pins 23 and 24.

It will be evident from FIGS. 1 and 2 that the lug 7 may be readily removed from the base member 14 by simply removing one or the other of roll or spiral pins 23 and 24 and then removing pin 19. A new lug may then be placed between the bifurcations 15 and 16 and the pin 19 reinserted in the perforations 15a, 16a and 20. Thereafter, the roll or spiral pin may be replaced and the assembly is ready for continued use. This simple replacement operation may be accomplished in a matter of minutes in the field. It obviates the necessity of removal of the driven element from the mining machine and minimizes down time.

The lug and base member assemblies of the present invention have a number of important features which are exemplified by the embodiment of FIGS. 1 and 2. First of all, it will be noted that the lug 7 is affixed to the base member 14 by a single pin 19. The cooperating lug and base member surfaces 13 and 17 are of sufficient size to sustain forces tending to pivot the lug 7 in either direction about the pin 19.

The arrow A indicates the cutting direction of the assembly. As used hereinafter and in the claims, the term "cutting direction" refers to the instantaneous direction of motion of the cutter bit and lug assembly and the base member, as imparted to them by the driven element. This is true irrespective of the nature of the driven element. Where the driven element is a cutting drum or a cutter wheel, which rotates about an axis, the cutting direction is defined as the tangent to the circle described by the assembly at any given instant. The term "cutting direction" refers only to the motion imparted to the assembly by the driven element, and is not intended to refer to additional motion imparted to the assembly by the advance of the entire mining machine or by oscillation, traverse or other motion imparted to that part of the mining machine bearing the driven element. As indicated above, the term "driven element" refers to that element of the mining machine to which the base member 14 is affixed. The nature of the driven element does not constitute a limitation on the present invention and may include cutter arms, cutter wheels, cutter chains, cutting drums and the like.

At any given instant, as the assembly advances in the cutting direction A, the assembly is subject to a number of cutting forces in a plurality of directions. Of the many cutting forces, the two primary ones are a vertical force indicated by arrow B and a horizontal force indicated by arrow C.

In an ideal situation, the cooperating bit abutment surface 6 and the lug abutment surface 11 and the cooperating lug surface 13 and base member surface 17, would be parallel to each other and would be perpendicular to the resultant force of forces B and C. Under these circumstances, the loading on the bit 1 would be along its axis; the loading on the lug would be sustained by the anvil portion 10 with little or no wear on the shank receiving perforation 9; and the loading on the base member 14 would be sustained entirely by its surface 17 with no loading on the pin 19.

As a practical matter, such an ideal situtation cannot be achieved; it can only be approximated. This is true for a number of reasons. For example, from instant to instant the magnitude of the forces B and C vary. As a consequence, the resultant force of forces B and C cannot be represented by a single, stationary arrow, but rather would have to be represented by an arrow, the position of which varies over a range of degrees. In addition, if both the bit and lug abutment surfaces and the lug and base member abutment surfaces were made substantially perpendicular to the resultant force of forces B and C, a number of other problems would arise. For example, too great a bit circle would result; of the angle of attack of the bit tip 4 would be improper; or there would be too little abutment surface between surfaces 13 and 17 on one side or the other of the pin 19; or too much material would be required in the manufacture of the base member 14 or the lug 17 to render them practical.

All of these factors make it clear that some sort of compromise must be made. It has been found that if the base member 14 and the lug 13 have at least one cooperating pair of abutting surfaces lying at an angle of 90° or less to the cutting direction (but not parallel thereto) these surfaces will sustain a substantial part of the resultant cutting forces and will relieve the pin 19 of a substantial part of these resultant cutting forces. It has further been found preferable that the angle of the cooperating abutting surfaces to the cutting direction be less than 90°. In the embodiment illustrated in FIGS. 1 and 2 the abutting surfaces 13 and 17 are illustrated as forming an angle of about 10°–15° to the cutting direction A. Field testing of this embodiment has shown that excellent results are achieved and that the pin 19 is relieved of a considerable amount of the resultant cutting forces.

Several additional steps may be taken to prolong the life of the base member 14. For example, the surface 17 may be subjected to a hardening treatment. The same is true of the inside surfaces of the bifurcations 15 and 16. This is diagrammatically illustrated by stippling with respect to the inside surface of the bifurcation 16 and the surface 17 in FIG. 2. Such hardening treatments would alleviate wear of these surfaces by the lug member 7. It would also be within the scope of the invention to provide the perforations 15a and 16a of the bifurcations 15 and 16 with replaceable bushings to alleviate wear on the base member by the pin 19. Such a bushing is indicated in dotted lines at 25 in the perforation 15a of bifurcation 15. The bushing further may have an annular rim (as shown) flush with the inside surface of the bifurcation 15 to provide additional replaceable surface against wear by the lug 7.

Figure 3:
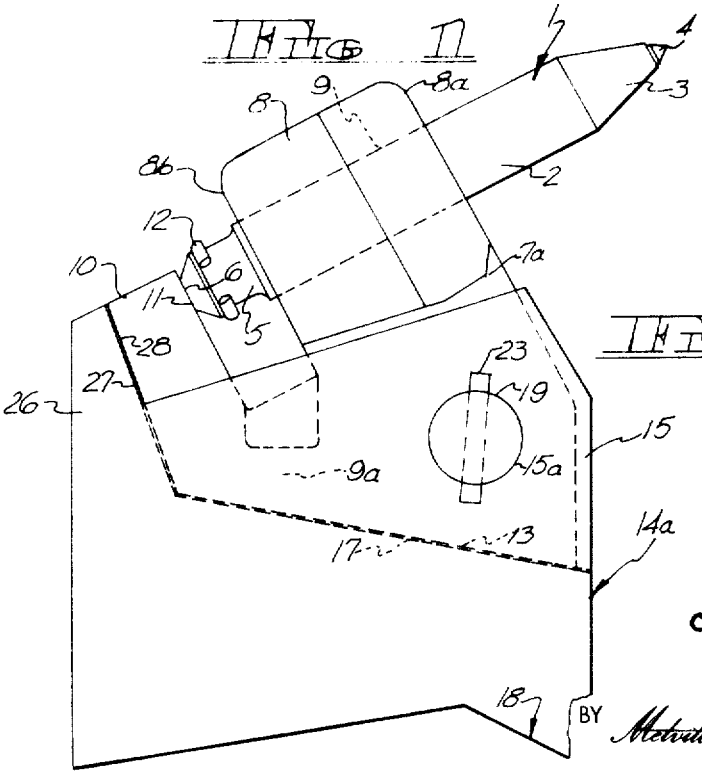
FIG. 3 is a side elevational view illustrating the provision of a rear wall portion on the mounting member of FIG. 1.

FIG. 3 illustrates an embodiment similar to that of FIGS. 1 and 2, and like parts have been given like index numerals. The base member 14a of FIG. 3 differs from the base member of FIGS. 1 and 2 in that it is provided with a rear wall portion 26 having a downwardly and forwardly sloping inner surface 27. The lug 7a differs from the lug 7 in FIGS. 1 and 2 in that the anvil portion 10 is formed with a downwardly and forwardly sloping rear surface 28. In all other respects, the embodiment of FIG. 3 is identical to that of FIGS. 1 and 2.

The provision of the rear wall portion 26 on the base member 14a accomplishes several things. First of all, it tends to deter the spreading of the bifurcations of the base member 14a (one of which is shown at 15) secondly, the inside surface 27 of the wall portion 26 abuts the surface 28 of the anvil portion of the lug, thus forming another pair of cooperating surfaces lying at an angle of 90° or less (shown at less than 90° in FIG. 3) to the cutting direction A. Thus the surfaces 27 and 28, in addition to the surfaces 13 and 17, further relieve the pin 19 of the resultant cutting forces.

Figure 4:
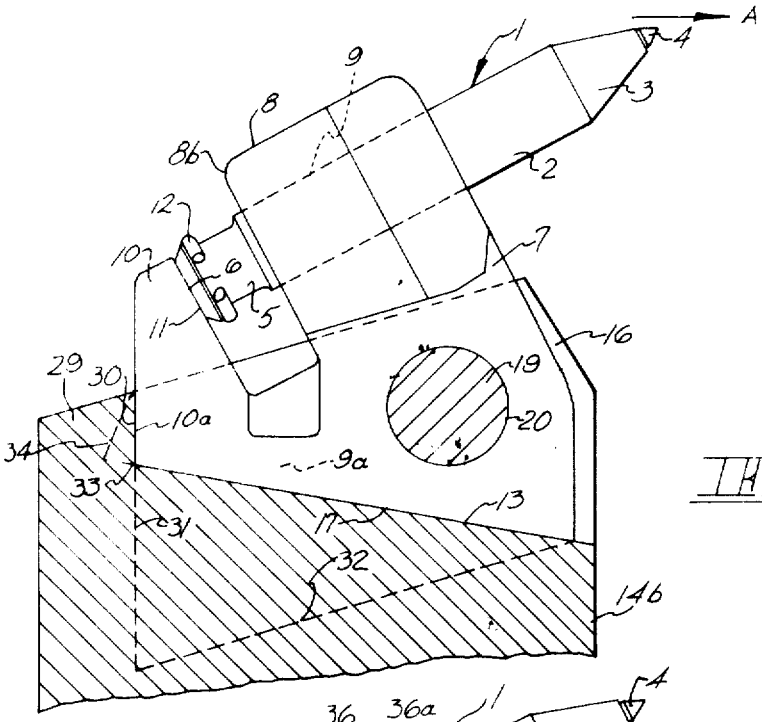
FIG. 4 is a side elevational view similar to FIG. 1 illustrating various angular relationships between the cooperating surfaces of the lug and the base member.

FIG. 4 illustrates another embodiment of the present invention. The cutter bit and lug are identical to those shown in FIG. 1, and like parts have been given like index numerals. The base member 14b, shown in cross section, is again substantially the same as the base member 14 of FIG. 1, except that it is provided with a rear wall portion 29. The rear wall portion 29 has an inner surface 30 adapted to abut against the rear surface of the anvil portion 10 of the lug. The structure thus far described differs from that of FIG. 3 only in that the surface 10a of the anvil portion of the lug and the inner surface 30 of the wall portion 29 of the base means lie at an angle of 90° to the cutting direction A. Thus these last mentioned surfaces, together with the surfaces 13 and 17, sustain the resultant cutting forces and relieve the pin 19 of much of them.

The dashed line 31 is intended to diagrammatically represent a continuation of the abutting surfaces 30 and 10a. The dashed line 32 is intended to represent abutting surfaces between the lug 7 and the base member 14b, equivalent to the surfaces 13 and 17, but sloping downwardly and rearwardly. It will be noted that the surfaces diagrammatically represented by the dashed line 32 do not lie at an angle of 90° or less to the cutting direction A. Nevertheless, this structure will relieve the pin 19 of much of the resultant cutting forces since the abutting surfaces represented by the dashed line 31 do lie at an angle of 90° or less to the cutting direction A.

Dashed line 33 is intended to diagrammatically indicate a continuation of the abutting surfaces 13 and 17. Dashed line 34 is intended to indicate abutting surfaces between the rear wall portion 29 and the anvil portion of the lug. In this instance, the abutting surfaces represented by the dashed line 34 do not lie at an angle of 90° or less to the cutting direction A. But the structure will relieve much of the resultant cutting forces from the pin 19 since the abutting surfaces 13 and 17 and the continuation of them at 33 do lie at an angle of 90° or less to the cutting direction A.

From the above it will be evident that if there is more than one pair of abutting surfaces between the lug and the base member, much of the resulting cutting forces can be relieved from the pin 19 so long as one of the pairs of abutting surfaces lies at an angle of 90° or less to the cutting direction A. Again it would be preferred if the angle in question were less than 90°. In all other respects, the assembly of FIG. 4 operates in the same manner and has the same advantages described with respect to the embodiments of FIGS. 1 through 3.

Figure 5:
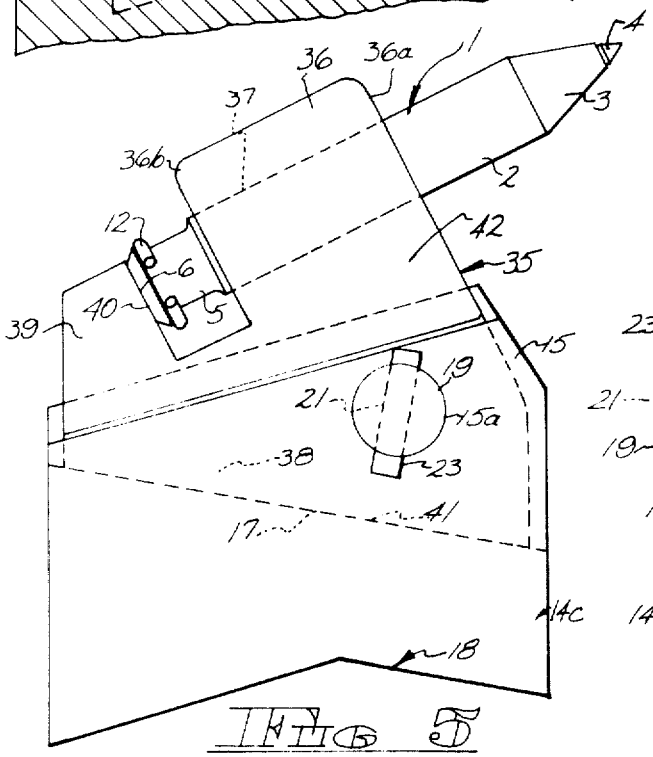
FIG. 5 is a side elevational view similar to FIG. 1 and illustrating the provision of a dovetail fit between the lug and base means.
Figure 6:
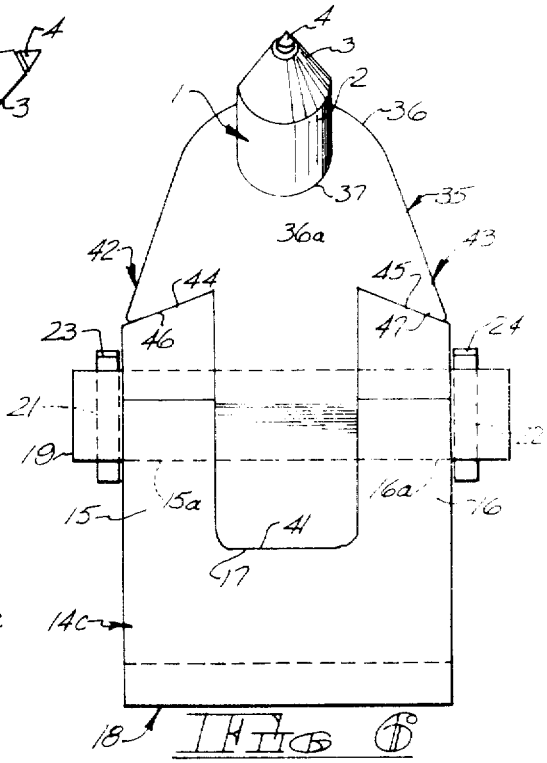
FIG. 6 is a front elevational view of the embodiment of FIG. 5.

FIGS. 5 and 6 illustrate an embodiment similar to that shown in FIGS. 1 and 2. The cutter bit is identical and like parts have been given like index numerals. Again, the same sort of retaining means is shown at 12.

The lug, generally indicated at 35, is similar to the lug 7 of FIGS. 1 and 2 in most respects. Therefore, it has a body portion 36 having a forward surface 36a and a rearwards surface 36b. There is a shank receiving perforation 37 equivalent to the shank receiving perforation 9 in FIGS. 1 and 2. The lug has a rearwardly extending portion 38 terminating in an anvil portion 39 with an abutment surface 40 adapted to cooperate with the abutment surface 6 of the cutter bit. Finally, the lug has a bottom surface 41 adapted to cooperate with a matting surface on the mounting means.

The lug 35 differs from the lug 7 of FIGS. 1 and 2 in that its side portions (generally indicated at 42 and 43) are extended laterally and undercut so as to provide upwardly and inwardly sloping surfaces 44 and 45 respectively.

The mounting means 14c of FIGS. 5 and 6 is, with one exception, identical to that shown in FIGS. 1 and 2 and like parts have been given like index numerals. The mounting means 14c differs from that shown in FIGS. 1 and 2 in that the upper edges of the bifurcations 15 and 16 are configured to provide surfaces 46 and 47 which slope upwardly and inwardly.

Again, for purposes of an exemplary showing, the lug 35 is illustrated as being maintained in position on the mounting means 14c by a pin. The pin is identical to that shown in FIGS. 1 and 2 and like parts have been given like index numerals. The pin 19 passes through the coaxial perforations 15a and 16a in the bifurcations of the mounting means 14c and through the perforation 48 in the lug. Again the pin may be provided with roll pins 23 and 24, or the like.

It will be immediately evident from FIGS. 5 and 6 that the undercut lug surfaces 44 and 45 and the upwardly and inwardly sloped mounting means surfaces 46 and 47 provide a dovetail relationship between the lug and mounting means. While these last mentioned surfaces will sustain, to some extent at least, the resultant cutting forces, primary reliance for the sustaining of these forces is still upon the cooperating surfaces 17 and 41. The primary purpose for the dovetail relationship is to prevent spread of the bifurcations 15 and 16 over a period of time, due to the cutting forces. In all other respects the structure of FIGS. 5 and 6 functions and can be replaced in the same manner described with respect to FIGS. 1 and 2.

Figure 8:
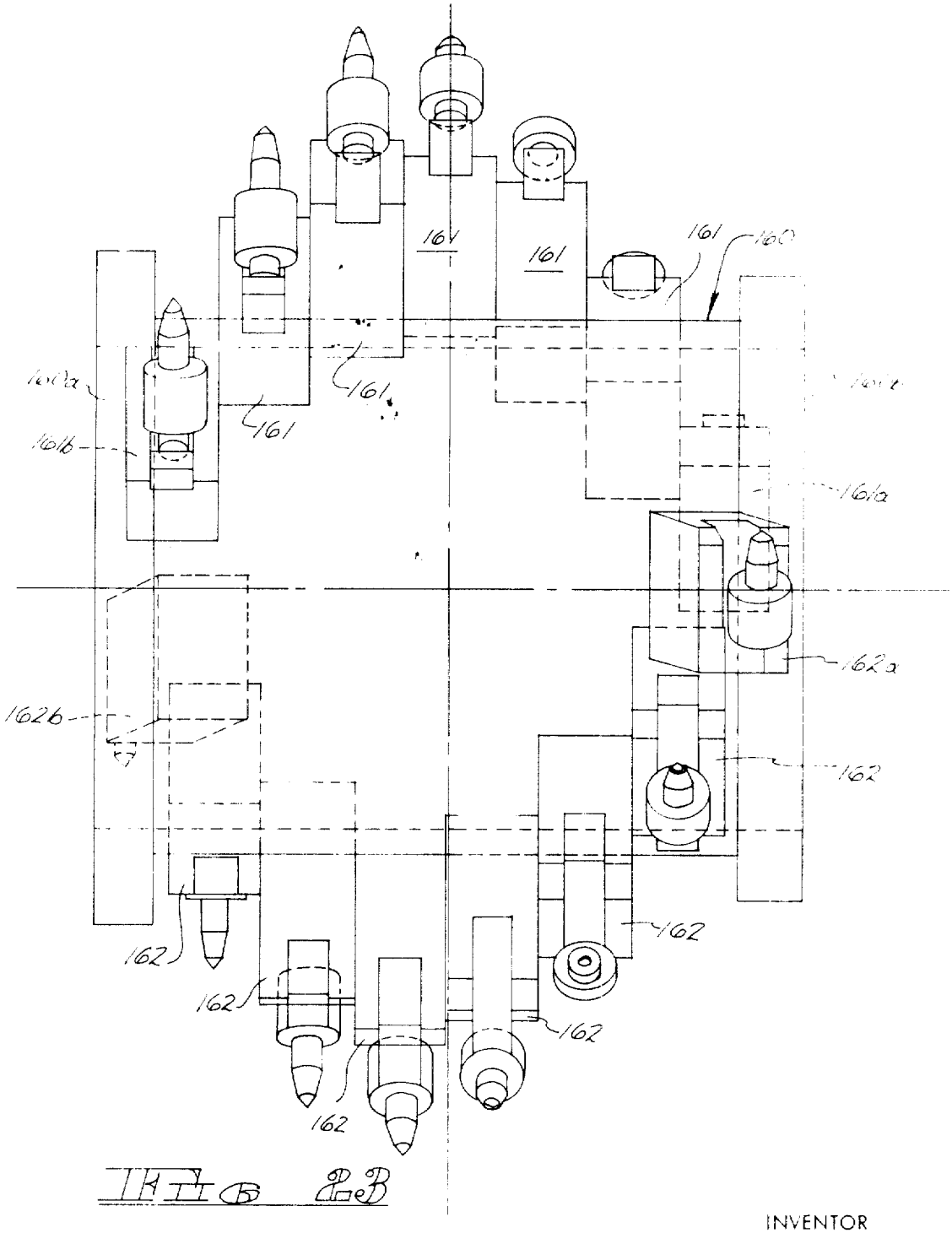
FIG. 8 is front elevational view of the embodiment of FIG. 7.

FIGS. 7 and 8 illustrate an embodiment similar to that shown in FIGS. 1 and 2, but wherein the lug is intended to straddle the base member. In FIGS. 7 and 8, the bit is identical that shown in FIGS. 1 and 2 and like parts have been given like index numerals. Again, for purposes of illustration, an identical retaining means is shown at 12. The lug 49 is similar to that of FIGS. 1 and 2 in that it has a body portion 50 with a forward surface 50a, a rearward surface 50b and a shank receiving perforation 51 extending therethrough. Further, the lug has a rearward extension 52 terminating in an anvil portion 53 having an abutment surface 54 adapted to cooperate with the bit abutment surface 6.

The lug 49 differs from the lug 7 of FIGS. 1 and 2 in that it has a pair of spaced, downwardly depending legs 55 and 56. The lug also has a downwardly and rearwardly sloping bottom surface 57 between the legs 55 and 56. The bottom-most edges of the legs 55 and 56 may terminate in downwardly and inwardly sloping surfaces, as shown at 58 and 59, respectively in FIG. 8.

The mounting means is generally indicated at 60. The mounting means may have a bottom generally indicated at 61 made up of a pair of surfaces, as will be described hereinafter. It will be understood, however, that the bottom 61 may have any appropriate configuration, depending upon the nature of the driven element to which it is to be affixed. The upper end of the mounting means 60 is narrowed as at 61 and terminates in a downwardly and rearwardly sloping surface 62 underlying and spaced from the lug surface 57. The mounting means is also provided on either side (at the base of its narrowed portion) with a pair of downwardly and inwardly sloping surfaces 63 and 64, adapted to cooperate with the lug leg surfaces 58 and 59, respectively.

Again, for purposes of an exemplary showing, the lug 49 is illustrated as being maintained in position on the mounting means 60 by means of a pin 65 passing through coaxial perforations 55a and 56a in the lug legs 55 and 56 and through a perforation 66 in the narrowed portion of the mounting means. As in the case of FIG. 1, the pin 65 may be provided with roll pins 67 and 68.

In the embodiment of FIGS. 7 and 8 the resultant cutting forces are sustained by the cooperating surfaces 58–63 and 59–64. It will be understood by one skilled in the art that the angular relationship of the surfaces 58–63 and 59–64 with respect to the resultant cutting forces, should be the same as that described with respect to the surfaces 13 and 17 of FIGS. 1 and 2. In determining these angular relationships, the same considerations should be kept in mind.

The surfaces 58–63 and 59–64 are shown in FIGS. 7 and 8 as sloping downwardly and inwardly. It will be understood by one skilled in the art that these surfaces need not be so angled and could lie in the same plane. However, when the surfaces 58–63 and 59–64 are angled as shown, the lug and mounting means will have a dovetail relationship tending to prevent the spreading of the lug legs 55 and 56 over a period of time due to the cutting forces.

FIGS. 9 and 10 illustrate the embodiment of FIGS. 1 and 2 provided with an alternative means for preventing the spreading of the bifurcations 15 and 16 of the mounting means 14. Again, like parts have been given like index numerals. In the embodiment of FIGS. 9 and 10 the bifurcations 15 and 16 are joined at the forward end of the base member by an integral wall portion 69. The wall portion 69 is positioned at the point where the bifurcations 15 and 16 are of the greatest height and will prevent their spreading over a period of time due to the cutting forces.

FIGS. 11, 12, 13 and 14 illustrate how the base member of the present invention may be used with a wide variety of lugs and cutter bits. In FIGS. 11 through 14 all of the base members are identical to the base member shown in FIGS. 1 and 2, and like parts have been given like index numerals. Similarly, in FIGS. 11 through 14 all of the lugs are maintained in their proper position on their base members by pin means identical to that shown in FIG. 1, and again like parts have been given like index numerals.

Figure 11:
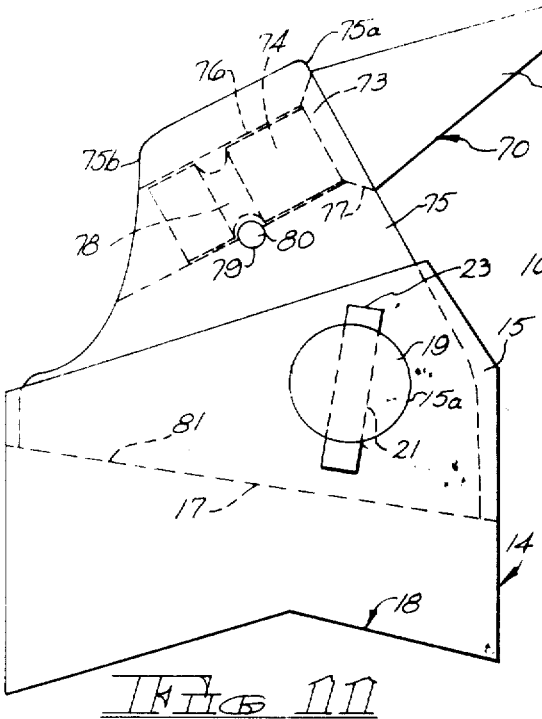
FIGS. 11 through 14 are side elevational views illustrating the use of different lug and cutter bit assemblies with the base member of FIG. 1.

Turning first to FIG. 11, it is intended to illustrate the use of the base member of the present invention with a typical pick-type bit frequently referred to as a "plum bob" bit. The bit, generally indicated at 70, comprises a tapered nose portion 71 terminating at one end in a hard cutting tip 72 and at the other end in a tapered abutment surface 73. Rearwardly of the abutment surface 73 there is a cylindrical shank 74. The lug 75 has a forward surface 75a, a rearward surface 75b and a shank receiving perforation 76 passing therethrough. At the forward surface of the lug, the shank receiving perforation 76 flares outwardly (as at 77) to provide a gauge determining abutment surface to cooperate with the bit abutment surface 73.

There are a number of different retaining means that can be used with bits of the type shown in FIG. 11. For purposes of an exemplary showing, the bit shank 74 is illustrated as having an annular notch 78. The lug is shown as having a transverse hole 79 which partially intersects the shank receiving perforation 76. The hole 79 is adapted to receive a pin 80. When in place, the pin 80 partially enters the annular notch 78 in the cutter bit shank, retaining the cutter bit in place during the cutting operation. The various elements may be so sized that the cutter bit is rotatable in the shank receiving perforation 76.

The lug 75 has a bottom surface 81 adapted to cooperate with the surface 17 of the base member in the same manner described with respect to the cooperation of surfaces 13 and 17 in FIG. 1.

Figure 12:
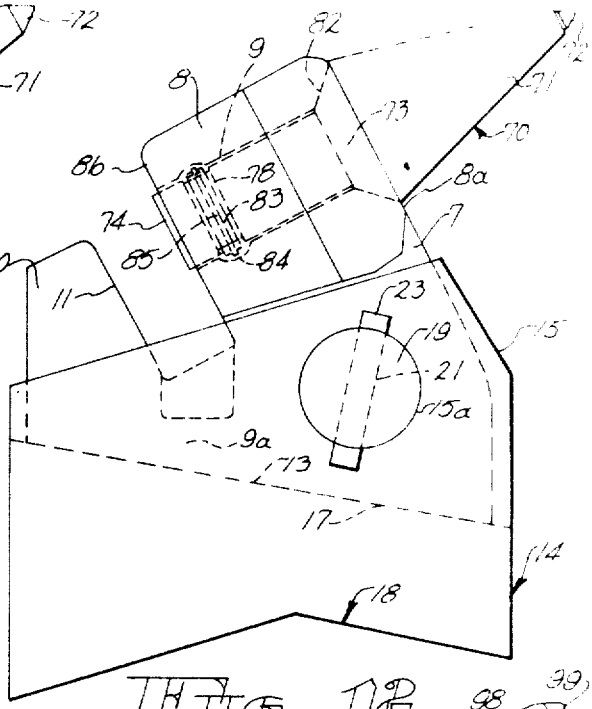

FIG. 12 illustrates a lug substantially identical to the lug of FIG. 1, and like parts have been given like index numerals. The lug 7 differs from its counterpart in FIG. 1 simply in that it has been modified to accept not only a bit of the type shown in FIG. 1 but also a bit of the type shown in FIG. 11. This is accomplished by providing the shank receiving perforation 9 with an outwardly flared portion 82 at the forward surface 8a of the lug body. The bit in FIG. 12 is substantially the same as the bit shown in FIG. 11 and like parts have been given like index numerals. The abutment surface 73 on the bit cooperates with the abutment surface 82 on the lug to determine the gauge or depth to which the bit extends into the shank receiving perforation 9. Again, the various elements may be so sized that the bit 70 is freely rotatable in the shank receiving perforation 9.

In the embodiment of FIG. 12, the lug 7 may be adapted to accommodate any of the well known types of retaining means for the bit. While not intended to constitute a limitation on the present invention, the bit shank 74 is illustrated as having an annular notch 78 adapted to accommodate a split metal retainer 83. The shank receiving perforation 9 is also provided with an annular notch 84 located opposite the shank notch 78. The retainer 85 has a centrally located annular raised portion. The parts are so configured that the ring may be compressed to be wholly accommodated within the annular notch 78 in the shank during insertion of the bit. When the bit is fully seated in the shank receiving perforation 9, the ring is free to expand slightly, entering the lug notch 84. The retaining ring 85 has an internal diameter slightly less than the diameter of the cutter bit shank 74 and an external diameter slightly greater than the diameter of the shank receiving perforation 9.

Figure 13:
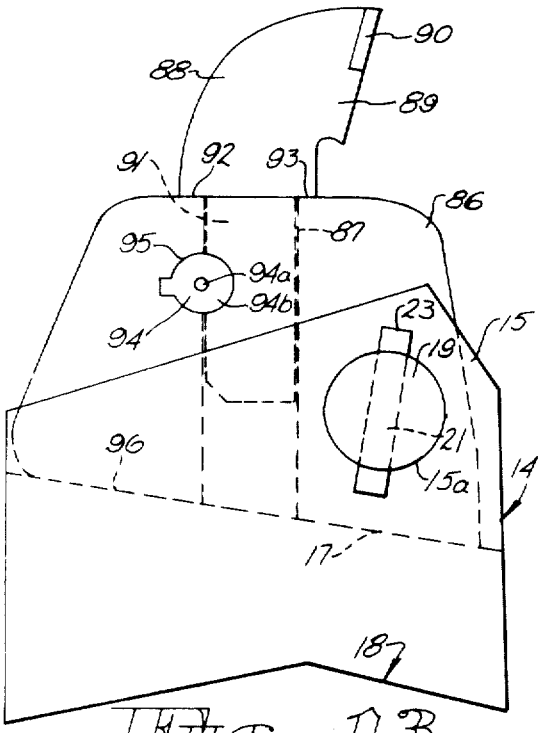

FIG. 13 illustrates the use of the base member of the present invention with lugs and bits of the well known type taught, for example, in U.S. Letters Patent. No. 3,114,537. In this instance, the lug 86 is provided with a vertically oriented shank receiving perforation 87 having a rectangular cross sectional configuration. The bit 88 comprises a head portion 89 with a hard cutting tip 90 and a downwardly depending shank 91. The head portion 89 has gauge determining abutment shoulders 92 and 93 adapted to cooperate with the top surface of the lug 86. The rear edge of the shank 91 may be provided with a hook-shaped notch of the type taught in U.S. Letters Patent No. 3,114,537 to accommodate a resilient retaining means 94 of the type taught in the same patent. Briefly, the retaining means comprises a pin 94a located in a body of resilient material 94b. The retaining means 94 is located in a transverse perforation 95 in the lug 86. The perforation 95 partially intersects the shank receiving perforation 87 so that the pin 94a may engage the notch in the bit shank 91 to maintain the cutter bit in seated position during the cutting operation. The lug 86 also has a bottom surface 96 adapted to cooperate with the surface 17 of the base member 14 in the same manner described with respect to the surfaces 13 and 17 in FIG. 1.

Figure 14:
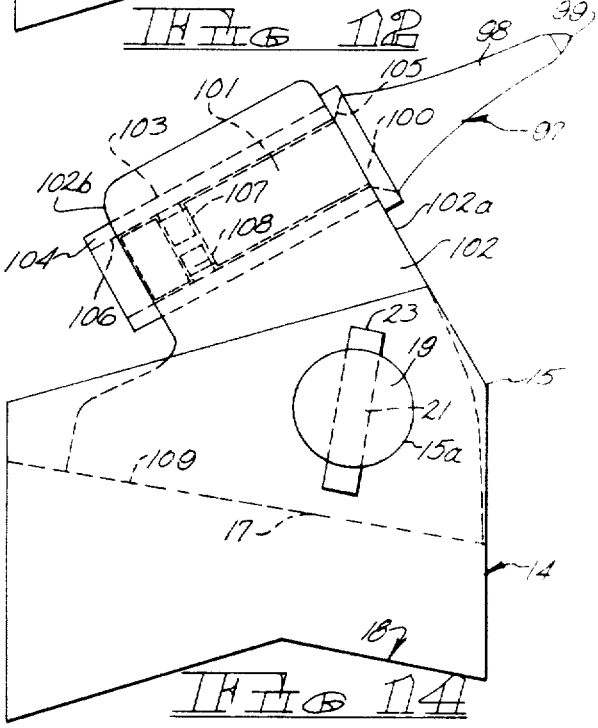
Figures 1B, 1D, 2D:
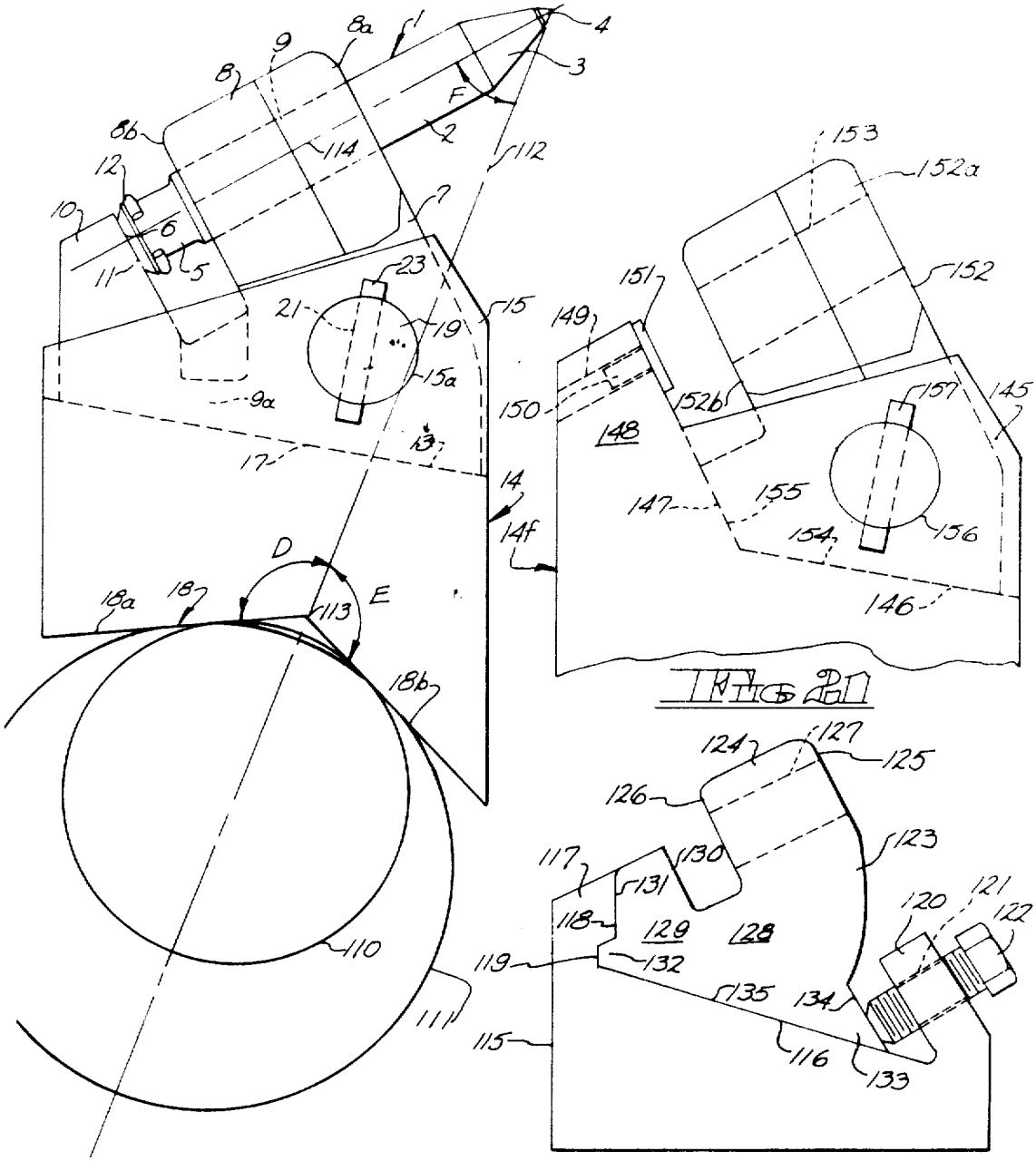

FIG. 14 illustrates the use of the base member of the present invention with a lug and cutter bit similar to that shown in FIG. 11. The bit 97 has a substantially conical nose 98 terminating at one end in a hard cutting tip 99 and at the other end in a tapered abutment surface 100. The remainder of the bit comprises a cylindrical shank 101. The lug 102 has a forward surface 102a and a rearward surface 102b with a perforation 103 extending therethrough. The perforation 103 is adapted to receive a headed sleeve 104. At the head of the sleeve there is a tapered surface 105 adapted to cooperate with the bit abutment surface 100. The longitudinal perforation 106 through the sleeve comprises a shank receiving perforation.

The sleeve 104 may be non-rotatively affixed in the lug perforation 103 by any suitable means including a frictional fit. On the other hand, the sleeve may be rotatable within the lug perforation 103, in which case some well known form of retaining means (not shown) must be provided to maintain the sleeve in place. Similarly, the bit 97 may be rotatable or non-rotatable in the sleeve 104 and some well known form of retaining means must be provided to maintain the bit in its seated position.

For purposes of an exemplary showing, the bit 97 is illustrated as being rotatable in the perforation 106 of the sleeve 104. The bit shank 101 is shown as having an annular notch 107 to accommodate a split metal ring 108. The parts are so sized that during the insertion of the bit shank in the sleeve perforation 106 the split metal ring 108 may be completely accommodated in the annular notch 107 of the shank. When the bit is in seated position, the split metal ring 108 will expand against the inside surface of the perforation 106 of the sleeve 104 in a frictional engagement. The inside diameter of the split metal ring will still be slightly less than the diameter of the bit shank 101 thus maintaining the bit in position. The lug 102 will have a bottom surface 109 adapted to cooperate with the surface 17 of the base member in the same manner described with respect to the surfaces 13 and 17 of FIG. 1.

FIGS. 12, 13 and 14 are typical examples of the above mentioned bits having a "knock-in, pry-out" engagement with their respective lugs. In all of the embodiments of FIGS. 11 through 14, the angular relationships of the bottom surfaces of the lugs and the surface 17 of the base member will be governed by the same considerations described with respect to FIGS. 1 and 2.

As indicated above, the bottom end of the base means of the present invention may be appropriate configured to be affixed to any type of driven element of a mining machine or the like. FIG. 15 diagrammatically illustrates how the bottom end 18 of the base member may be configured so as to be self-locating when affixed to a cutting drum or the peripheral edge of a cutting wheel. It will be understood that the representation of the drums 110 and 111 are strictly diagrammatical, cutting drums normally having a diameter of about 18 inches or less to about 32 inches or more.

FIG. 15 illustrates the assembly affixed to the drum 110 so that the hard cutting tip 4 of the bit 1 will have the proper attack angle for the material being cut. Line 112 comprises a center line of the drum 110 passing through the cutting tip 4. The bottom end 18 of the base member 14 comprises two planar surface portions 18a and 18b lying at an angle with respect to each other and meeting at a point 113 lying along the center line 112. Surface 18a forms an angle D with the center line 112. Surface 18b forms an angle E with the same center line. Angle D and angle E are equal.

The actual angularity of the surface portions 18a and 18b does not constitute a limitation on the present invention. However, the angles D and E must be equal and must be more than 90°. When this is done, and the bit, lug and base member assembly is placed in its proper position on the drum 110, the bit will automatically have its proper attack angle. This is true irrespective of the size of the drum to which the assembly is to be affixed. Thus, it will be noted that the center line 112 for drum 110 is also the center line for larger drum 111. It will further be noted that the included angle F between the bit axis 114 and the center line 112 remains constant both for drum 110 and drum 111.

In all of the embodiments thus far described, the means for maintaining the bit lug on the base member has been shown as being a pin. As indicated above, other means may be used for this purpose. Attention is called to FIG. 16.

In FIG. 16 a base member 115 is shown, equivalent to the base member 14 in FIG. 1. The base member 115 has a sloping upper surface 116 equivalent to the surface 17 of the base member of FIG. 1. At the rear of the base member there is an upward extension 117 having an abutment surface 118 and an undercut portion 119. At the forward end of the base member there is a second upwardly and rearwardly oriented extension 120 having a threaded perforation 121 therein to receive a set screw 122.

FIG. 16 also illustrates a lug 123 similar to the lug 7 of FIG. 1. Thus, the lug 123 has a body portion 124 with a forward surface 125 and a rearward surface 124. A shank receiving perforation 127 passes through the body portion. The lug has a rearward extension 128 terminating in an anvil portion 129. The anvil portion has an abutment surface 130 equivalent to the abutment surface 11 in FIG. 1. The anvil 129 has a second abutment surface 131 adapted to cooperate with the abutment surface 118 on the base member. Finally, the anvil 129 has an extension 132 adapted to be received in the undercut 119.

At the forward end of the lug 123 there is an extension 133 having a downwardly and forwardly sloping surface 134 adapted to be engaged by the set screw 122.

The bottom surface 135 of the lug 123 is configured to cooperate with the surface 116 of the base member in the same manner described with respect to the surfaces 13 and 17 of FIG. 1. The angularity of the surfaces 116 and 135 may be appropriately determined by the same considerations described with respect to FIG. 1.

As shown, the lug 123 is adapted to be used with a bit of the type shown at 1 in FIG. 1. It is within the scope of the invention to modify the lug 123 as shown in FIG. 12 for use with a bit of the type shown at 70 in the same Figure.

To remove the lug 123 from the base member 115, it is only necessary to loosen the set screw 122. A new lug may then be placed on the base member surface 116 with its extension 132 located in the undercut 119. Upon tightening of the set screw 122, the assembly is ready for further operation. It will also be appreciated that any of the lugs illustrated in FIGS. 11 through 14 may be appropriately configured for use with the base member 115.

Figure 17:
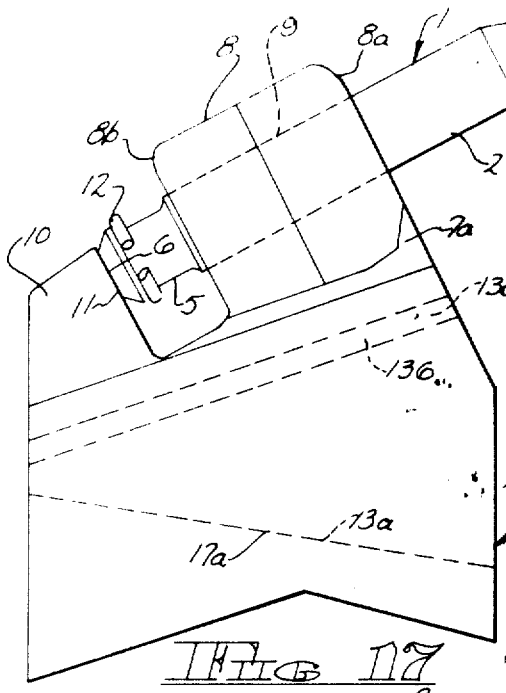
FIG. 17 is a side elevational view of another embodiment of the present invention wherein the lug is affixed to the base member by a wedging action having a frictional fit.
Figure 18:
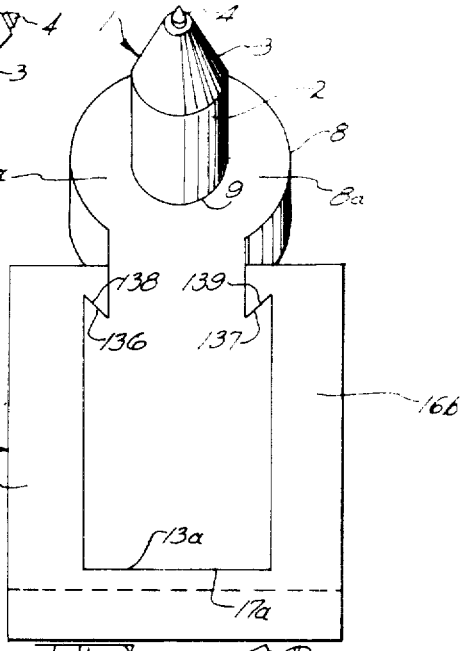
FIG. 18 is a front elevational view of the structure of FIG. 17.

FIGS. 17 and 18 illustrate another manner in which the lug may be maintained in position on the base member. In FIG. 18, the bit and retaining means are identical to that shown in FIG. 1 and the lug is substantially the same, so that like parts have been given like index numerals. The lug 7a differs from the lug 7 of FIG. 1 in that its bottom portion is slightly wider. The bottom surface 13a of the lug is equivalent to the surface 13 in FIG. 1. The lug 7a is, however, provided on either side with downwardly and inwardly sloping surface 136 and 137. These surfaces also slope rearwardly and downwardly of the lug.

The base member 14d is substantially similar to the base member 14 of FIG. 1. The base member has bifurcations 15b and 16b with a surface 17a therebetween, equivalent to the surface 17 of FIG. 1.

The upper ends of the bifurcations 15b and 16b are widened and provided with undercut surfaces 138 and 139. These surfaces also slope rearwardly and downwardly of the base member.

It will be evident that the lug surface 13a cooperates with the base member surface 17a and the lug surface 136 and 137 cooperate with the base member surfaces 138 and 139 to provide a wedging engagement between the lug 7a and the base member 14d. The lug will thus be frictionally engaged in the base member and the resultant cutting forces will tend to force the lug toward an increased frictional engagement. The cooperating surfaces 136–138 and 137–139 provide a dovetail fit between the lug and the base member preventing spreading of the base member bifurcations 15b and 16b. The determination of the angularity of surfaces 13a and 17a may be determined in the same manner described with respect to the surfaces 13 and 17 of FIG. 1.

Thus, to replace the lug 7a of FIGS 17 and 18, it is only necessary to administer blows to the lug by a suitable tool in the cutting direction. A new lug may then be inserted in the base member 15d and driven home by blows in the opposite direction. Again it will be understood that any of the lugs illustrated in FIG. 11 through 14 may be appropriately configured to be used with the base member 14d.

Figure 19:
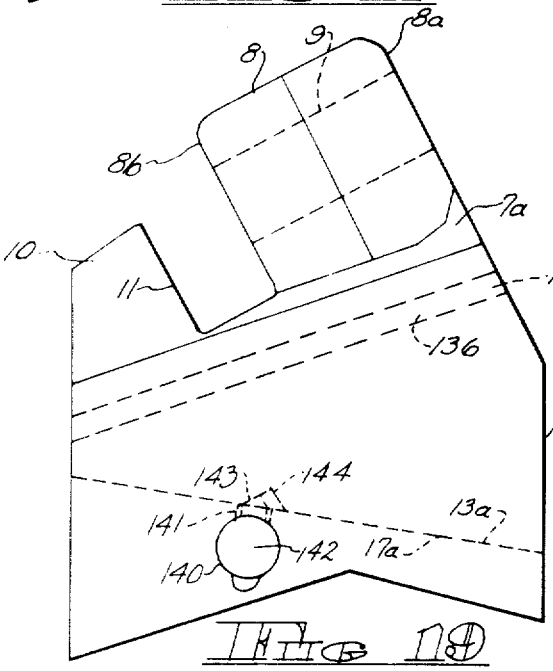
FIG. 19 is a side elevational view similar to FIG. 17 and illustrating the provision of a resilient retaining means for the lug.
Figure 20:
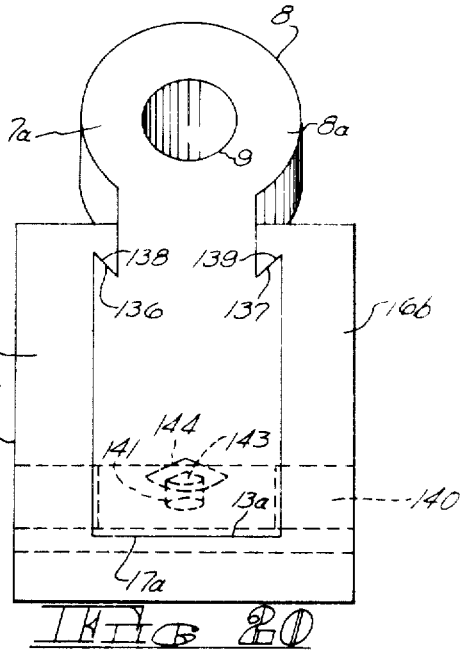
FIG. 20 is a front elevational view of the structure of FIG. 19.

FIGS. 19 and 20 illustrate a lug and base member substantially identical to that of FIGS. 17 and 18 and like parts have been given like index numerals.

The base member 14e differs from that of FIGS. 17 and 18 only in that it is provided with a transverse hole 140 below its surface 17a. A second hole 141 extends from the surface 13a into the hole 140 and is located centrally of the bifurcations 15b and 16b. Mounted in the hole 140 a resilent retaining mears of the type taught in U.S. Letters Patent No. 3,526,436. For purposes of an exemplary showing a retainer is shown in hole 140 comprising a cylindrical body of resilient material 142 with a nose element 143 embedded therein. The nose element extends through hole 141.

The lug 7a differs from that shown in FIGS. 17 and 18 only in that its bottom surface 13a is provided with a notch or conical depression 144. The conical depression is configured to accept the nose element 143 of the resilient retaining means and may be so positioned that the nose element 143 bears against one side of the depression 144 tending to urge the lug to its seated position. It would be within the scope of the invention to use any other suitable and well known retaining means for the lug, as for example a plunger with a resilient backing as taught in U.S. Letters Patent No. 3,254,922.

In the embodiment of FIGS. 19 and 20, as the lug 7a is inserted into the base 14a, the nose 143 of the resilient member 142 may be depressed, the resilient member being able to expand in the hole 140. When the lug is in its seated position, the nose 143 will return to the position shown in FIGS. 19 and 20 and will assist the frictional fit in retaining the lug 7a in its full seat position.

FIG. 21 shows yet another embodiment of the present invention. This embodiment is similar to that shown in FIG. 3. The base member 14f has a pair of bifurcations (one of which is shown at 145) with two surfaces 146 and 147 therebetween. These surfaces are similar in the surface 13 and 27 of FIG. 3. The base member 14f also has a rear wall portion 148. The rear wall 148 has a perforation 149 therethrough adapted to receive the stem 150 of a replaceable abutment surface 151.

A lug is shown at 152 having a forward surface 152a, a rearward surface 152b and a shank receiving perforation 153 extending therebetween. It will be noted that the shank receiving perforation 153 is in alignment with the replaceable abutment surface 151. The bottom portion of the lug has a pair of surfaces 154 and 155 adapted to cooperate with the surfaces 146 and 147, respectively on the base member. Finally, the lug may be held in place on the base member by any suitable means including a transverse pin 156 similar to the pin 19 of FIG. 3 and provided with roll pins or the like (one of which is shown at 157).

The assembly of FIG. 21 is adapted to be used with a bit of the type shown in FIG. 3 and differs from FIG. 3 primarily in that the abutment surface, adapted to cooperate with a bit abutment surface, is located on the base member, rather than on the lug. Since the base member is not intended for replacement, it is desirable to provide the replaceable abutment surface 151 so that the rear wall portion 148 of the base member does not become unduly worn. Again, the angularity of surfaces 154–146 and 147–155 may be varied, but should be determined in accordance with the teachings set forth with respect to FIGS. 1, 2 and 3.

Figure 22:
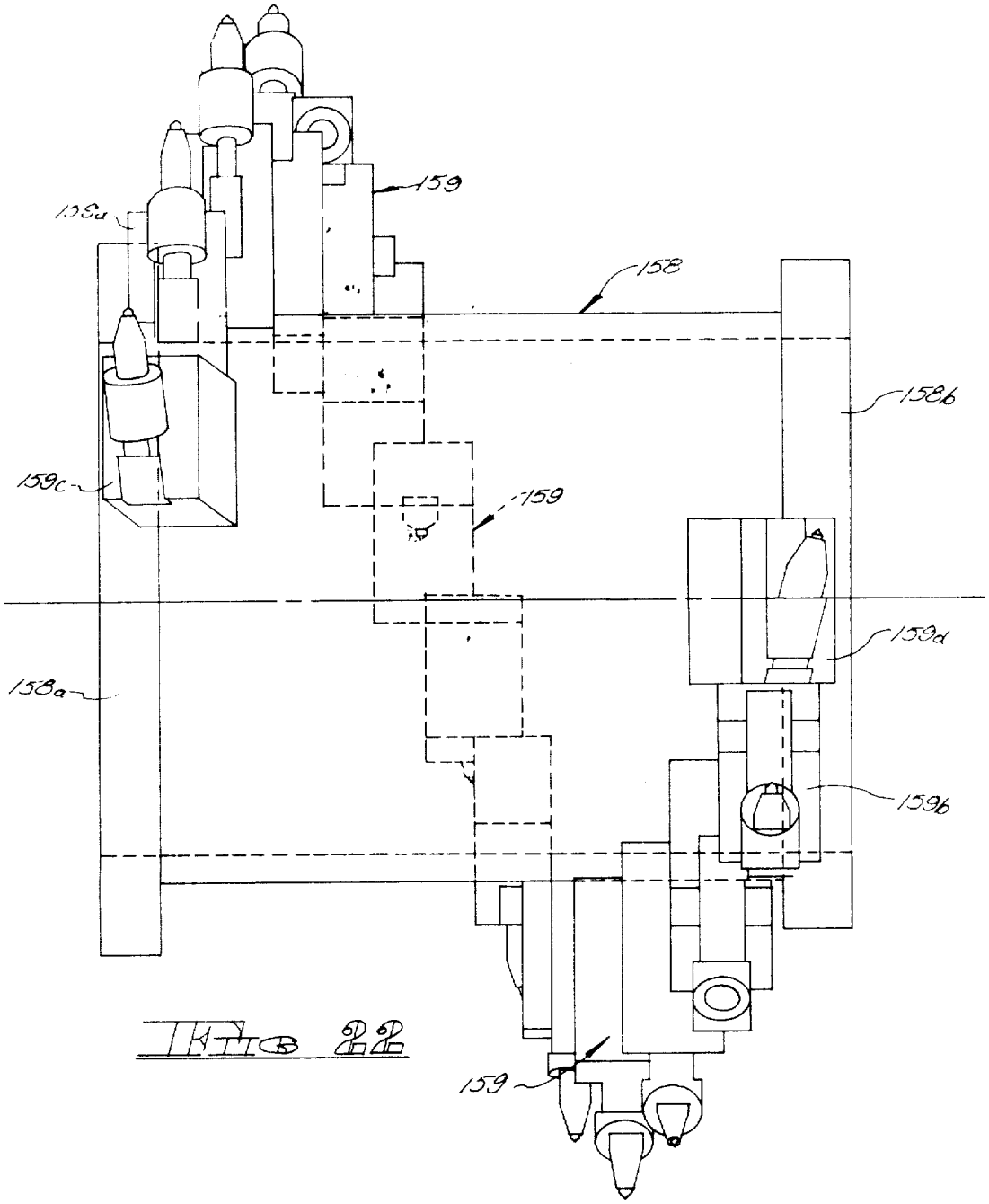
FIG. 22 is a semi-diagrammatic view of a cutting drum with lug and cutter bit assemblies and base members of the present invention affixed thereto so as to form a complete helix.

FIG. 22 illustrates an exemplary arrangement of cutter bit, lug and base member assemblies about a typical cutting drum. The cutting drum is generally indicated at 158. All of the cutter bit, lug and base member assemblies can be identical and are generally indicated at 159. It will be noted that the two assemblies designated 159a and 159b have the bottom end of their base members appropriately notched so that they may rest in part on the drum rims 158a and 158b, respectively. All of the assemblies are mounted on the drum perpendicular to the drum axis with the exception of the outermost two assemblies designated 159c and 159d. These last mentioned assemblies are not only notched so as to rest in part on the drum rims, but also are mounted at an angle to the drum axis. In this way, assemblies 159a and 159c make clearance cuts for the rim 158a while the assemblies 159b and 159d make clearance cuts for the drum rim 158b.

FIG. 23 illustrates an alternative arrangement of the assemblies on a typical cutting drum. The drum is generally indicated at 160 and has rims 160a and 160b. All of the cutter bit, lub and base member assemblies may be of the same type. In this instance, however, they are arranged in a double helix. The assemblies of the first helix are indicated by the index numeral 161. The forwardmost and rearwardmost assemblies of the first helix are indicated at 161a and 161b, respectively. It will be noted that in both of these assemblies the base member is appropriately configured to sit in part at least on the drum rims 160a and 160b. All of the assemblies of the first helix are oriented perpendicular to the drum axis. The assemblies of the second helix are indicated by the index numeral 162. The first and last assemblies of the second helix are designated as 162a and 162b, respectively. With the exception of the first and last assemblies, all of the assemblies of the second helix are oriented perpendicular to the drum axis. The first and last assemblies, however, have the bottom of their base members appropriately configured to cause them to lie at an angle to the drum axis so that they can make a clearance cut for the drum rims.

In the embodiment of FIG. 23 it will be noted that the assemblies of the second helix are so located that the bits thereof will follow paths of travel between the paths of travel of the bits of the first helix. Thus, the bits of the second helix will cut the cores left by the bits of the first helix.

Figure 24:
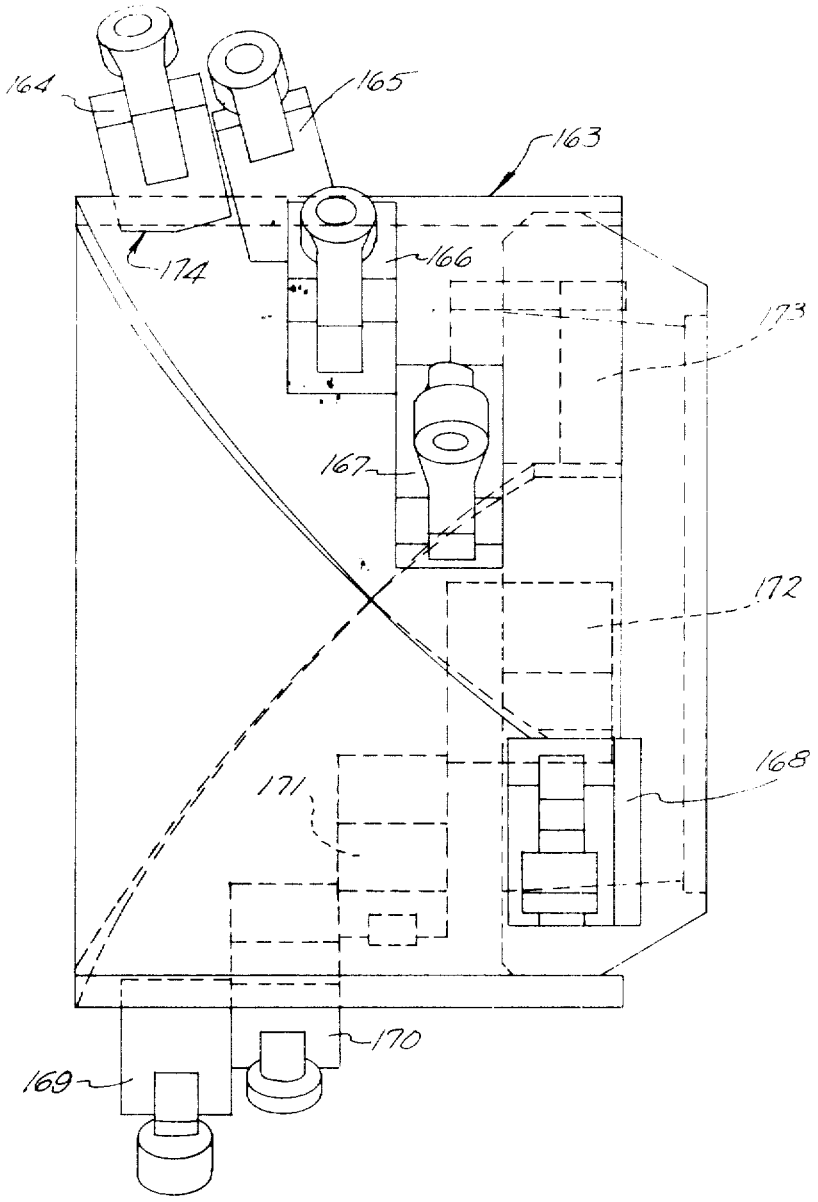
FIG. 24 is a semi-diagrammatic front elevational view of a cutting drum having lug and cutter bit assemblies and base member of the present invention affixed thereto in a double helix, again with the cutter bits of the second helix having paths of travel lying between the paths of travel of the cutter bits of the first helix.

In a mining machine of the type having a plurality of coaxial cutting drum segments extending substantially the full width of the entry being cut, the drum segments being movable vertically between a lowermost position and an uppermost position so that most of the entire entry is cut by the drums, it is common to provide at the ends drum segments which make cuts such that the lower and upper corners of the entry are rounded. FIG. 24 illustrates the assemblies of the present invention affixed in an exemplary arrangement about such a drum. The drum is generally indicated at 163. The assemblies are again located about the drum in a double helix. The assemblies of the first helix are indicated at 164 through 168. The assemblies of the second helix are indicated at 169 through 173. Again, the assemblies of the second helix are so arranged that the cutter bits thereof follow paths of travel between the paths of travel of the cutter bits of the assemblies of the first helix. Thus, as viewed in FIG. 24 from left to right, the successive cuts are made by the cutter bits of assemblies 164, 169, 165, 170, 166, 171, 167, 172, 168 and 173, in that order. In order to provide the desired rounded cut, the bit circles of the bits in the assemblies of the present invention diminish in radius as viewed from left to right in FIG. 24 in the above mentioned order. All of the assemblies on the drum 163 may be provided with the same bit, the diminishing bit radii and the proper spacing of adjacent bit circles being accomplished by the size of base means used and the angularity to the drum axis at which each base means is affixed to the drum.

In the exemplary embodiment of FIG. 24, the four right-handmost assemblies (i.e., assemblies 173, 168, 172 and 167) may use base means of the same height, the variance in bits circles being accomplished by the angularity to the drum axis at which the base members are affixed to the drum. The remaining assemblies (i.e., assemblies 171, 166, 170, 165, 169 and 164) may use base members increasing in height, in the order given.

It will be noted that all of the assemblies are affixed to the drum at an angularity of 90° to the drum axis except assemblies 164, 165, 168, 172 and 173. As viewed in FIG. 24, all of the last mentioned skewed assemblies lean slightly to the left, with the exception of assembly 173 which leans slightly to the right and makes the clearance cut for the right end of the drum.

All of the assemblies may be provided with base members having bottom ends configured as described with respect to FIG. 15, so that they are self-locating with respect to the proper bit angle. In those assemblies which are skewed, this may be accomplished by providing an additional relief on the bottom end of the base member. Such a relief is generally indicated at 174 on the base member of assembly 164.

Modifications may be made in the invention without departing from the spirit of it. For example, all of the embodiments shown in FIGS. 1 through 4, 9 through 15 and 21 may be modified to have the dovetail relationship between lug and base member taught with respect to FIGS. 5 and 6. In all of the embodiments, any one or all of those surfaces of the base member contacted by the lug may be subjected to a hardening treatment (for example, surfaces 46 and 47 in FIG. 6, surfaces 58 and 59 in FIG. 9 and surfaces 136 and 137 in FIG. 20). All of those embodiments wherein the maintaining means is a transverse pin passing through portions of the base member and the lug may have the perforation or perforations in the base member provided with bushings, as taught with respect to FIG. 2. Any of the various types of lugs shown in the drawings may be modified to straddle the base member in the manner taught with respect to FIGS. 7 and 8.

In the embodiment of FIGS. 1 and 2, the bifurcations 15 and 16 are illustrated as running longitudinally of the base member from its forward portion to its rearward portion. It will be understood by one skilled in the art that it would be within the scope of the present invention to provide bifurcations extending transversely of the base member with the at least one base member abutment surface extending therebetween. The bottom portion of the lug would have to be appropriately modified and the same is true of the means to maintain the lug in place on the base member. The embodiment of FIG. 16, for example, illustrates one version of a base member provided with transverse bifurcations 117 and 120. In a similar manner, the embodiment of FIGS. 7 and 8 illustrate a base member having a longitudinally extending narrowed portion 61. It would be within the scope of the invention to provide a narrowed portion extending transversely of the upper portion of the base member. In such an instance, the lug would have to be provided with forward and rearward downwardly depending legs, rather than legs extending longitudinally of the lug. Again the means of maintaining the lug on the base member would have to be appropriately modified. Such an embodiment can be visualized from FIG. 8. For example, if the bit 1 were considered to be turned 90° with respect to the lug 50, FIG. 8 could then be considered to be a side elevation of such an embodiment wherein the narrowed portion 61 would extend transversely rather than longitudinally of the base member.

In the structure shown in FIG. 15, the surfaces 18a and 18b on the bottom end 18 of the base member are shown and described as being planar. It will be understood by one skilled in the art that these surfaces need not be planar. When they are not planar, the only requirement is that each surface contact the periphery of the drum at at least one point, and that the tangents to the drum at those points of contact intersect each other on the center line 112. Thus, in the Figure, the lines designated 18a and 18b could be considered tangent lines to the points of contact of the base member and the drum, irrespective of the particular configuration of the surfaces 18a and 18b.

Finally, with respect to the embodiment of FIGS. 19 and 20, it will be understood by one skilled in the art that it would be within the scope of the invention to provide the bottom portion of the lug 7a with perforations equivalent to the perforations 40 and 41 and with a resilient retaining means equivalent to the retaining means 142. In such an instance, a depression equivalent to the depression 144 would be located in the abutment surface 17a of the base member.

The embodiments of the invention in which an exclusive property or privilege is claimed are defined as follows:

1. In a mining machine and the like of the type having at least one driven element adapted to advance a plurality of cutter bit and lug assemblies in the cutting direction, said cutter bits each having a cutting tip to act upon the material being cut, means for removably affixing said lugs to said driven element, said means comprising a block-like base member supporting each lug, said base member having a front portion facing in the cutting direction and a rear portion facing in the opposite direction, said base member having a bottom end affixable to said driven element, said base member having an upper portion to engage said lug, one of said lug and said upper portion of said base member being bifurcated, the bifurcations extending in a direction from said front portion toward said rear portion of said base member, the other of said lug and said upper portion of said base member being receivable between said bifurcations, at least one surface on said upper portion configured to lie in parallel abutting relationship with at least one surface on said lug, said at least one base member surface lying at an agle to the cutting direction of less than 90° and being non-parallel thereto so as to sustain the bulk of the resultant cutting forces on said base member, said angle opening in the direction of advance of said driven element.

2. The structure claimed in claim 1 including retaining means to hold said lug in position on said upper portion of said base member.

3. The structure claimed in claim 1 wherein said bottom end of said base member is configured to be affixed to the curved peripheral surface of a driven element of circular cross section, said bottom end being configured to contact said periperal surface at at least one point on either side of that center line of said driven element which would pass through the cutting tip of a cutter bit and lug assembly engaged by said upper portion of said base member, the tangents to said peripheral surface at said points of contact intersecting each other on said centerline whereby said base member is self orienting with respect to bit angle on driven elements of different diameters.

4. The structure claimed in claim 1 wherein said upper portion of said base member has two surfaces adapted to be in parallel abutting relationship with two surfaces on said lug, each of said base member surfaces lying at an angle to the cutting direction opening in the direction of advance of said driven element, said angle of each of said base member surfaces to said cutting direction being less than 90°, each of said base member surfaces being non-parallel to the cutting direction.

5. The structure claimed in claim 1 wherein said upper portion of said base member is bifurcated, said at least one abutment surface on said upper portion lying between said bifurcations, said bifurcations being spaced and configured to receive the bottom portion of a lug therebetween whereby said at least one abutment surface between said bifurcations will be in parallel abutting relationship with a bottom surface of said lug.

6. The structure claimed in claim 5 including retaining means to hold said lug in position on said upper portion of said base member.

7. The structure claimed in claim 5 wherein said bottom end of said base member is configured to be affixed to the curved peripheral surface of a driven element of circular cross section, said bottom end being configured to contact said peripheral surface at at least one point on either side of that center line of said driven element which would pass through the cutting tip of a cutter bit and lug assembly engaged by said upper portion of said base member, the tangents to said peripheral surface at said points of contact intersecting each other on said center line whereby said base member is self orienting with respect to bit angle on driven elements of different diameters.

8. The structure claimed in claim 5 wherein said bifurcations are joined by a wall extendnig therebetween and adjacent said front portion of said base member.

9. The structure claimed in claim 5 wherein the facing inside surfaces of said bifurcations are provided with a hard surface to minimize wear thereof by said lug.

10. The structure claimed in claim 5 wherein said abutment surface on said base member between said bifurcations is provided with a hard surface to minimize wear thereof by said bottom surface on said lug.

11. The structure claimed in claim 5 wherein said bifurcations have upper edges configured to have an interlocking fit with undercut shoulders on said lug to prevent spreading of said bifurcations by the cutting forces.

12. The structure claimed in claim 11 wherein each of said upper edges of said bifurcations is provided with a hard surface to minimize wear thereof by said undercut lug shoulders.

13. The structure claimed in claim 5 wherein said bifurcations are joined by a wall extending therebetween adjacent said rear portion of said base member, said wall having a surface between said bifurcations adapted to be in parallel abutting relationship to a cooperating surface on said lug.

14. The structure claimed in claim 13 wherein said base member is to be used with a lug accepting a cutter bit of the type having an elongated shank terminating at one end in a cutting tip and terminating at the other end in an abutment surface, a replaceable abutment surface removably affixed to said wall, said replaceable abutment surface being positioned on said wall to cooperate with said bit abutment surface.

15. The structure claimed in claim 13 wherein said surface on said wall lies at an angle to the cutting direction of 90° or less and is non-parallel thereto, said angle opening in the direction of advance of said driven element.

16. The structure claimed in claim 5 wherein said bifurcations have coaxial transverse holes therethrough to receive a pin adapted to pass therethrough and through a cooperating hole in said bottom portion of said lug to maintain said lug in position on said upper portion of said base member.

17. The structure claimed in claim 16 including replaceable sleeves in said transverse coaxial holes in said bifurcations.

18. The structure claimed in claim 2 wherein said base member is to be used with a lug of the type having downwardly depending bifurcations comprising legs in spaced relationship, said upper portion of said base member having a portion of reduced width to be received between said lug legs, said upper portion of said base member having at least one abutment surface on either side of said portion of reduced width to lie in parallel abutting relationship with the bottom edges of said lug legs, said abutment surfaces on said base member each comprising a surface lying at an angle to the cutting direction of less than 90° and being non-parallel thereto, said angle opening in the direction of advance of said driven element.

19. The structure claimed in claim 18 including retaining means to hold said lug in position on said upper portion of said base member.

20. The structure claimed in claim 18 wherein said bottom end of said base member is configured to be affixed to the curved peripheral surface of a driven element of circular cross section, said bottom end being configured to contact said peripheral surface at at least one point on either side of that center line of said driven element which would pass through the cutting tip of a cutter bit and lug assembly engaged by said upper portion of said base member, the tangents to said peripheral surface at said points of contact intersecting each other on said center line whereby said base member is self orienting with respect to bit angle on driven elements of different diameters.

21. The structure claimed in claim 18 wherein said abutment surfaces on said upper portion of said base member are configured to have an interlocking relationship with said parallel abutting surfaces on said lug legs to prevent spreading of said lug legs by the cutting forces.

22. The structure claimed in claim 18 wherein said portion of reduced width has a transverse hole therethrough adapted to receive a pin passing therethrough and through coaxial holes in the lug legs to maintain the lug in position on said upper portion of said base member.

23. The structure claimed in claim 18 wherein the sides of said portion of reduced width adapted to lie adjacent said lug legs are each provided with a hard surface to minimize wear thereof by said lugs legs.

24. The structure claimed in claim 18 wherein said abutment surfaces on said upper portion of said base member are each provided with a hard surface to minimize wear thereof by said parallel abutting surfaces on said lug legs.

25. In a mining machine and the like of the type having at least one driven element adapted to advance a plurality of cutter bit and lug assemblies in the cutting direction, said cutter bits each having a cutting tip to act upon the material being cut, the combination of a lug and means for removably affixing said lug to said driven element, said lug comprising a body having a perforation to receive the shank of a cutter bit, said body having at least one abutment surface, said means to removably affix said lug to said driven element comprising a block-like base member, said base member having a front portion facing in the cutting direction and a rear portion facing in the opposite direction, said base member having a bottom end affixable to said driven element, said base member having an upper portion to support said lug, one of said lug and said upper portion of said base member being bifurcated, the bifurcations extending in a direction from said front portion toward said rear portion of said base member, the other of said lug and said upper portion of said base member being receivable between said bifurcations, said upper portion of said base member having at least one abutment surface lying in parallel abutting relationship to said at least one abutment surface on said lug, said parallel abutting lug and base member surfaces lying at an angle to the cutting direction of less thn 90° and being non-parallel thereto, said angle opening in the direction of advance of said driven element, and means to maintain said lug in position on said base member.

26. The structure claimed in claim 25 wherein said bottom end of said base member is configured to be affixed to the curved peripheral surface of a driven element of circular cross section, said bottom end being configured to contact said peripheral surface at at least one point on either side of that center line of said driven element which would pass through the cutting tip of a cutter bit in said lug, the tangents to said peripheral surface at said points of contact intersecting each other on said center line whereby said base member is self orienting with respect to bit angle on driven elements of different diameters.

27. The structure claimed in claim 25 wherein said upper portion of said base member is bifurcated, said at least one base member abutment surface lying between said bifurcations, said lug having a bottom portion lying between said bifurcations with said at least one lug abutment surface in parallel abutting relationship with said at least one base member abutment surface.

28. The structure claimed in claim 27 wherein said bifurcations are joined by a wall therebetween at said front portion of said base member.

29. The structure claimed in claim 27 wherein the facing inside surfaces of said bifurcations are provided with hard surfaces to minimize wear thereof by said lug.

30. The structure claimed in claim 27 wherein said abutment surface on said base member between said bifurcations is provided with a hard surface to minimize wear thereof by said bottom surface on said lug.

31. The structure claimed in claim 27 wherein said bottom end of said base member is configured to be affixed to the curved peripheral surface of a driven element of circular cross section, said bottom end being configured to contact said peripheral surface at at least one point on either side of that center line of said driven element which would pass through the cutting tip of a cutter bit in said lug, the tangents to said peripheral surface at said points of contact intersecting each other on said center line whereby said base member is self orienting with respect to bit angle on driven elements of different diameters.

32. The structure claimed in claim 27 wherein said bifurcations are joined by a wall therebetween adjacent said rear portion of said base member, said wall having an abutment surface between said bifurcations, said lug having a cooperating abutment surface at the rear thereof, said wall abutment surface and said rear lug abutment surface lying in parallel abutting relationship.

33. The structure claimed in claim 32 wherein said lug is of the type having a shank receiving perforation extending through the body thereof and is to be used with a cutter bit of the type having an elongated shank terminating at its forward end in a cutting tip and at its rearward end in abutment surface extending rearwardly beyond said lug body, a replaceable abutment surface being removably affixed to said wall, said replaceable abutment surface being positioned on said wall to cooperate with said bit abutment surface.

34. The structure claimed in claim 32 wherein said abutment surface on said wall lies at an angle to the cutting direction of 90° or less and is non-parallel thereto, said angle opening in the direction of advance of said driven element.

35. The structure claimed in claim 34 wherein said angle of said abutment surface on said wall to said cutting direction is less than 90°.

36. The structure claimed in claim 27 wherein said bifurcations and said bottom portion of said lug therebetween have coaxial holes therein, said means to maintain said lug in position on said base member comprising a pin passing through said coaxial holes, and means to prevent axial movement of said pin.

37. The structure claimed in claim 36 including replaceable sleeves in said transverse coaxial holes in said bifurcations.

38. The structure claimed in claim 27 wherein each of said bifurcations has a projection thereon at the upper edge thereof, said projections extending toward each other and being undercut so as to have undercut abutment surfaces sloping downwardly and toward each other, said undercut abutment surfaces also lying at an acute angle to said base member abutment surface between said bifurcations, said acute angle opening toward said direction of advance of said driven element, said bottom portion of said lug having abutment surfaces thereon in parallel abutting and interlocking relationship to said undercut abutment surfaces on said bifurcations, said base member abutment surface between said bifurcations and cooperating lug abutment surface together with said undercut bifurcation abutment surfaces and said cooperating lug abutment surfaces being so oriented as to form a wedge-type fit between said lug and said base member to maintain said lug on said base member by a frictional fit when said lug is fully seated on said base member.

39. The structure claimed in claim 38 including a resilient retaining means to assist in maintaining said lug in said fully seated position on said base member.

40. The structure claimed in claim 38 wherein a resilient retaining means is mounted in one of said base member and said bottom portion of said lug, one of said base member abutment surface between said bifurcations and said cooperating lug abutment surface having a depression therein, said depression being engaged by said resilient retaining means when said lug is in said fully seated position on said base member.

41. The structure claimed in claim 38 including a transverse hole in said base member below said abutment surface between said bifurcations, a second hole in said base member extending from said transverse hole through said last mentioned abutment surface, a resilient retaining means in said transverse hole having a nose portion extending through said second hole and above said last mentioned abutment surface, a depression in said lug abutment surface in parallel abutting relationship to said last mentioned base member abutment surface, said nose extending into said depression to further maintain said lug in position on said base member.

42. The structure claimed in claim 27 wherein said lug has undercut shoulders extending longitudinally on opposite sides thereof, said bifurcations having upper edges configured to have an interlocking engagement with said undercut shoulders on said lug to prevent spreading of said bifurcations by the cutting forces.

43. The structure claimed in claim 42 wherein said upper edges of said bifurcations are each provided with a hard surface to minimize wear thereof by said undercut shoulders of said lug.

44. The structure claimed in claim 26 wherein said upper portion of said base member has a portion of reduced width, said upper portion having at least one abutment surface on either side of said portion of reduced width, said lug bottom portion having downwardly depending bifurcations comprising legs in spaced relationship, each of said lug legs terminating in an abutment surface, said lug being mounted on said base member with said lug legs located on either side of said portion of reduced width and each of said lug leg abutment surfaces being in parallel abutting relationship to the adjacent one of said base member abutment surfaces, the abutting pairs of lug and base member abutment surfaces lying at an angle to the cutting direction of less than 90° and being non-parallel thereto, said angle opening in the direction of advance of said driven element.

45. The structure claimed in claim 44 wherein said abutment surfaces on said base member and abutment surfaces on said lug legs are configured to have an interlocking fit to prevent spreading of said lug legs due to the cutting forces.

46. The structure claimed in claim 44 wherein said lug legs and said portion of reduced width therebetween have coaxial holes extending therethrough, said means to maintain said lug in position on said base member comprising a pin extending through said coaxial holes, and means to prevent axial movement of said pin.

47. The structure claimed in claim 44 wherein the sides of said portion of reduced width adapted to lie adjacent said lug legs are provided with hard surfaces to minimize wear thereof by said lug legs.

48. The structure claimed in claim 44 wherein said abutment surfaces on said upper portion of said base member are each provided with a hard surface to minimize wear thereof by said parallel abutting surfaces on said lug legs.

49. The structure claimed in claim 44 wherein said bottom end of said base member is configured to be affixed to the curved peripheral surface of a driven element of circular cross section, said bottom end being configured to contact said peripheral surface at at least one point on either side of that center line of said driven element which would pass through the cutting tip of a cutter bit in said lug, the tangents to said peripheral surface at said points of contact intersecting each other on said center line whereby said base member is self orienting with respect to bit angle on driven elements of different diameters.

50. A lug for use with a mining machine of the type having at least one driven element adapted to advance a plurality of cutter bit and lug assemblies in a cutting direction, there being a plurality of base members on said driven element having bifurcated upper ends to which said lugs are removably affixed each by a single pin passing through coaxial perforations in said bifurcations of its respective base member, said lug comprising a body having a perforation to receive the shank of a cutter bit, said lug having a bottom portion so sized as to fit between said bifurcations of its respective one of said base members and having a lug abutment surface adapted to lie in parallel abutting relationship to a base member abutment surface between said bifurcations of its respective base member, said abutment surface on said lug lying at an angle to the cutting direction of less than 90° and being non-parallel thereto when said lug is affixed to its respective base member, said angle opening in the direction of advance of said driven element, said lug having a hole in said bottom portion oriented transversely of said lug abutment surface to receive said pin.

51. The structure claimed in claim 50 wherein said lug body has an undercut shoulder extending along each side thereof.

52. The structure claimed in claim 51 wherein said lug abutment surface lies at an acute angle to said undercut shoulders, said angle opening toward said direction of advance of said driven element.

53. A lug for use with a mining machine of the type having at least one driven element adapted to advance a plurality of cutter bit and lug assemblies in a cutting direction, there being a plurality of base members on said driven element to the upper end portions of which said lugs are removably affixed, said lug comprising a body, said body being bifurcated, the bifurcations thereof comprising a pair of downwardly depending legs in spaced relationship and configured to straddle said upper end portion of its respective base member, said lug legs terminating in abutment surfaces intended to lie in parallel abutting relationship to corresponding abutment surfaces on said base member to either side of said straddled upper end portion thereof, each of said abutment surfaces on said legs lying at an angle of less than 90° to the cutting direction and being non-parallel thereto when said lug is affixed to said base member, said angle opening in a direction of advance of said driven element.

54. The structure claimed in claim 53 wherein said abutment surfaces on said lug legs are so configured as to have an interlocking fit with said abutment surfaces on said base member, whereby to prevent spreading of said lug legs due to the cutting forces.

55. The structure claimed in claim 53 wherein each of said lug legs has a transverse perforation therethrough, said perforations being coaxial and being so positioned as to be coaxial with a corresponding perforation in said straddled upper end portion of said base member for the receipt of a pin passing therethrough, whereby said lug is pinned to said base member.

56. The structure claimed in claim 15 wherein said angle of said surface on said wall to said cutting direction is less than 90°.

*57. In a mining machine and the like of the type having at least one driven element adapted to advance a plurality of cutter bit and lug assemblies in the cutting direction, said cutter bits each having a cutting tip to act upon the material being cut, means for removably affixing said lugs to said driven element, said means comprising a block-like base member supporting each lug, said base member having a front portion facing in the cutting direction and a rear portion facing in the opposite direction, said base member having a bottom end affixable to said driven element, said base member having an upper portion to engage said lug, one of said lug and said upper portion of said base member being bifurcated, the bifurcations being parallel and extending in a direction from said front portion toward said rear portion of said base member, the other of said lug and said upper portion of said base member being receivable between said bifurcations, at least one surface on said upper portion configured to lie in parallel abutting relationship with at least one surface on said lug, said abutting surfaces being arranged to sustain the bulk of the resultant cutting forces on said base member.*

*58. In a mining machine and the like of the type having at least one driven element adapted to advance a plurality of cutter bit and lug assemblies in the cutting direction, said cutter bits each having a cutting tip to act upon the material being cut, the combination of a lug and means for removably affixing said lug to said driven element, said lug comprising a body having a perforation to receive the shank of a cutter bit, said body having at least one abutment surface, said means to removably affix said lug to said driven element comprising a block-like base member, said base member having a front portion facing in the cutting direction and a rear portion facing in the opposite direction, said base member having a bottom end affixable to said driven element, said base member having an upper portion to support said lug, one of said lug and said upper portion of said base member being bifurcated, the bifurcations being parallel and extending in a direction from said front portion toward said rear portion of said base member, the other of said lug and said upper portion of said base member being receivable between said bifurcations, said upper portion of said base member having at least one abutment surface lying in parallel abutting relationship to said at least one abutment surface on said lug, said parallel abutting lug and base member surfaces being arranged to sustain the bulk of the resultant cutting forces on said base member, and means to maintain said lug in position on said base member, whereby said last mentioned means is relieved of a substantial amount of the cutting forces.*

*59. A lug for use with a mining machine of the type having at least one driven element adapted to advance a plurality of cutter bit and lug assemblies in a cutting direction, there being a plurality of base members on said driven element having bifurcated upper ends to which said lugs are removably affixed each by a single pin passing through coaxial perforations in said bifurcations of its respective base member, said lug comprising a body having a perforation to receive the shank of a cutter bit, said lug having a bottom portion so sized as to fit between said bifurcations of its respective one of said base members and having a lug abutment surface adapted to lie in parallel abutting relationship to a base member abutment surface between said bifurcations of its respective base member, said abutment surfaces being arranged to sustain the bulk of the resultant cutting forces on said base member, said lug having a hole in said bottom portion oriented transversely of said lug abutment surface to receive said pin, whereby said pin is relieved of a substantial amount of the cutting forces.*

*60. A lug for use with a mining machine of the type having at least one driven element adapted to advance a plurality of cutter bit and lug assemblies in a cutting direction, there being a plurality of base members on said driven element to the upper end portions of which said lugs are removably affixed, said lug comprising a body, said body being bifurcated, the bifurcations thereof comprising a pair of downwardly depending legs in spaced relationship and configured to straddle said upper end portion of its respective base member, said lug legs ter-*

*minating in abutment surfaces intended to lie in parallel abutting relationship to corresponding abutment surfaces on said base member to either side of said straddled upper end portion thereof, said abutting lug leg and base member abutment surfaces being arranged to sustain the bulk of the resultant cutting forces on said base member.*

References Cited

The following references, cited by the Examiner, are of record in the patented file of this patent or the original patent.

UNITED STATES PATENTS

| | | | |
|---|---|---|---|
| 3,088,720 | 5/1963 | Hlinsky | 299—91 X |
| 2,587,065 | 2/1952 | Robbins | 299—91 X |
| 1,468,866 | 9/1923 | Morgan | 299—92 X |
| 1,468,914 | 9/1923 | Morgan | 299—93 X |
| 2,857,835 | 10/1958 | Fitzgerald | 37—142 R UX |

ERNEST R. PURSER, Primary Examiner

U.S. Cl. X.R.

37—142A; 175—413; 299—86